United States Patent
Neos et al.

(10) Patent No.: US 8,767,340 B1
(45) Date of Patent: Jul. 1, 2014

(54) SPIRAL BAND END DETECTION

(75) Inventors: Perry Neos, Los Altos, CA (US); Luan Ton-That, San Jose, CA (US); Man Cheung, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/494,487

(22) Filed: Jun. 12, 2012

Related U.S. Application Data

(63) Continuation of application No. 12/834,820, filed on Jul. 12, 2010, now Pat. No. 8,208,216, which is a continuation of application No. 12/188,118, filed on Aug. 7, 2008, now Pat. No. 7,764,457.

(60) Provisional application No. 60/955,176, filed on Aug. 10, 2007.

(51) Int. Cl.
    *G11B 21/02* (2006.01)
    *G11B 5/596* (2006.01)
    *G11B 15/12* (2006.01)

(52) U.S. Cl.
    USPC .............................. 360/75; 360/77.07; 360/61

(58) Field of Classification Search
    None
    See application file for complete search history.

(56) References Cited

U.S. PATENT DOCUMENTS

| | | |
|---|---|---|
| 6,775,091 B1 | 8/2004 | Sutardja |
| 6,987,636 B1 | 1/2006 | Chue et al. |
| 6,992,852 B1 | 1/2006 | Ying et al. |
| 7,002,761 B1 | 2/2006 | Sutardja et al. |
| 7,019,937 B1 | 3/2006 | Liikanen et al. |
| 7,068,459 B1 | 6/2006 | Cloke et al. |
| 7,088,533 B1 | 8/2006 | Shepherd et al. |
| 7,113,362 B1 | 9/2006 | Lee et al. |
| 7,167,333 B1 | 1/2007 | Liikanen et al. |
| 7,209,312 B1 | 4/2007 | Sutardja |
| 7,248,427 B1 | 7/2007 | Everett et al. |
| 7,307,807 B1 | 12/2007 | Han et al. |
| 7,623,313 B1 * | 11/2009 | Liikanen et al. ............. 360/75 |
| 7,764,457 B1 | 7/2010 | Neos et al. |
| 7,869,158 B1 | 1/2011 | Cheung et al. |
| 8,077,422 B1 | 12/2011 | Ton-That et al. |
| 8,085,492 B1 | 12/2011 | Cheung et al. |
| 2007/0195445 A1 | 8/2007 | Vanlaanen et al. |
| 2007/0211369 A1 | 9/2007 | Yang et al. |
| 2008/0013202 A1 | 1/2008 | Shepherd et al. |
| 2008/0013203 A1 | 1/2008 | McMurtrey |
| 2008/0030889 A1 | 2/2008 | Smith et al. |
| 2008/0030894 A1 | 2/2008 | Sun et al. |

\* cited by examiner

*Primary Examiner* — Andrew L Sniezek

(57) ABSTRACT

Methods, systems and computer program products for detecting an end of a reference spiral band are described. A first portion of servo information may be written on a disk using the reference spiral band. By detecting an end of a reference spiral band, a new reference spiral band may be launched. A read/write head of a hard disk drive may subsequently use the new spiral band to write the remaining portion of the servo information, which aids the writing of data tracks on the disk.

18 Claims, 17 Drawing Sheets

SPIRAL BAND END DETECTION

CROSS-REFERENCE TO RELATED APPLICATIONS

This application is a continuation application of, and claims priority to, pending U.S. patent application Ser. No. 12/834,820, filed on Jul. 12, 2010, entitled "Spiral Band End Detection", which is a continuation of U.S. patent application Ser. No. 12/188,118, filed on Aug. 7, 2008, now U.S. Pat. No. 7,764,457, entitled "Spiral Band End Detection", which claims priority from U.S. Provisional Application Ser. No. 60/955,176, filed on Aug. 10, 2007, entitled "Spiral Band and Detection". The application herein claims the benefit of priority of all of the above listed patent applications and hereby incorporates by reference in their entirety the said patent applications.

TECHNICAL FIELD

The subject matter of this application is generally related to servo systems.

BACKGROUND

In magnetic-medium-based storage devices, data can be stored on circular, concentric tracks on a magnetic disk surface. A read/write head can retrieve and record data on a magnetic layer of a rotating disk as the head flies on a cushion of air over the disk surface. When retrieving data, magnetic field variations can be converted into an analog electrical signal, which can then be amplified and converted to a digital signal for signal processing. To guarantee the quality of the information stored on and read back from the disk, the read/write head needs to be precisely positioned at substantially the center of a track during both writing and reading. A closed-loop servo system, driven by servo information embedded in a dedicated portion of the track, can be used as a reference for positioning the head.

The servo information generally defines the position of the data tracks and are generally written with great accuracy to ensure that the head servo system operates properly. The servo information can be written on each surface as a radially extending set of spokes or wedges. The portion of a servo wedge at a particular track location may contain a sync field, and index mark, a gray coded track number, and two or more fine-positioned offset bursts configured in an echelon across the track. Head positioning relative to a track center can be determined and corrected, if necessary, by reading and noting the respective amplitudes and timings of the offset bursts.

Conventionally, a servo writer is used to write the embedded servo information on the disk surface. A servo writer can include a large base (e.g., granite base) to minimize the effects of vibration. The servo writer also may use precision fixtures to hold the target drive, a precision, laser-interferometer-based actuator arm positioning mechanism to place the arms radially with respect to the axis of rotation of the disks in the drive, and an external clock head to position the servo wedges in time. Conventional servo writers are typically large in size and expensive to be manufactured. Further, as track density increases, the servo writing time required by to write the servo information also increases, which can create a bottleneck in the disk drive manufacturing process.

SUMMARY

Methods, systems and computer program products for detecting an end of a reference spiral band are described. A first portion of servo information may be written on a disk using the reference spiral band. By detecting an end of a reference spiral band, a new reference spiral band may be launched. A read/write head of a hard disk drive may subsequently use the new spiral band to write the remaining portion of the servo information, which aids the writing of data tracks on the disk.

In some implementations, a method includes: designating one or more spirals as ending spirals, writing a band of spirals including the designated spirals, collecting data associated with the band of spirals, determining a running average value from the collected data, and identifying one or more ending spirals from the band of spirals based on the running average value.

In some implementations, a method includes: writing a first band of spirals including a first spiral set and a second spiral set, writing servo information using the first spiral set and the second spiral set, collecting data from the first spiral set and the second spiral set, and determining an end of the first band based on the collected data.

In some implementations, a method includes: writing a first band of spirals including a first spiral set and a second spiral set, determining an end of the first band of spirals, writing a first portion of servo information using at least one of the first spiral set and the second spiral set, terminating the first portion of servo information at the end of the first band of spirals, writing a second band of spirals including a third spiral set and a fourth spiral set, and writing a second portion of servo information using at least one of the third spiral set or the fourth spiral set.

In some implementations, a method includes: collecting data from one or more reference spirals in a band of reference spirals, the band of reference spirals including a first reference spiral and a second reference spiral, determining a running average value using the collected data, track following on the first reference spiral, switching to track follow on the second reference spiral, and determining an end of one of the first or second reference spiral based on the running average value and the first reference spiral or the second reference spiral.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Hard Disk Drive System Overview

Figure 1:
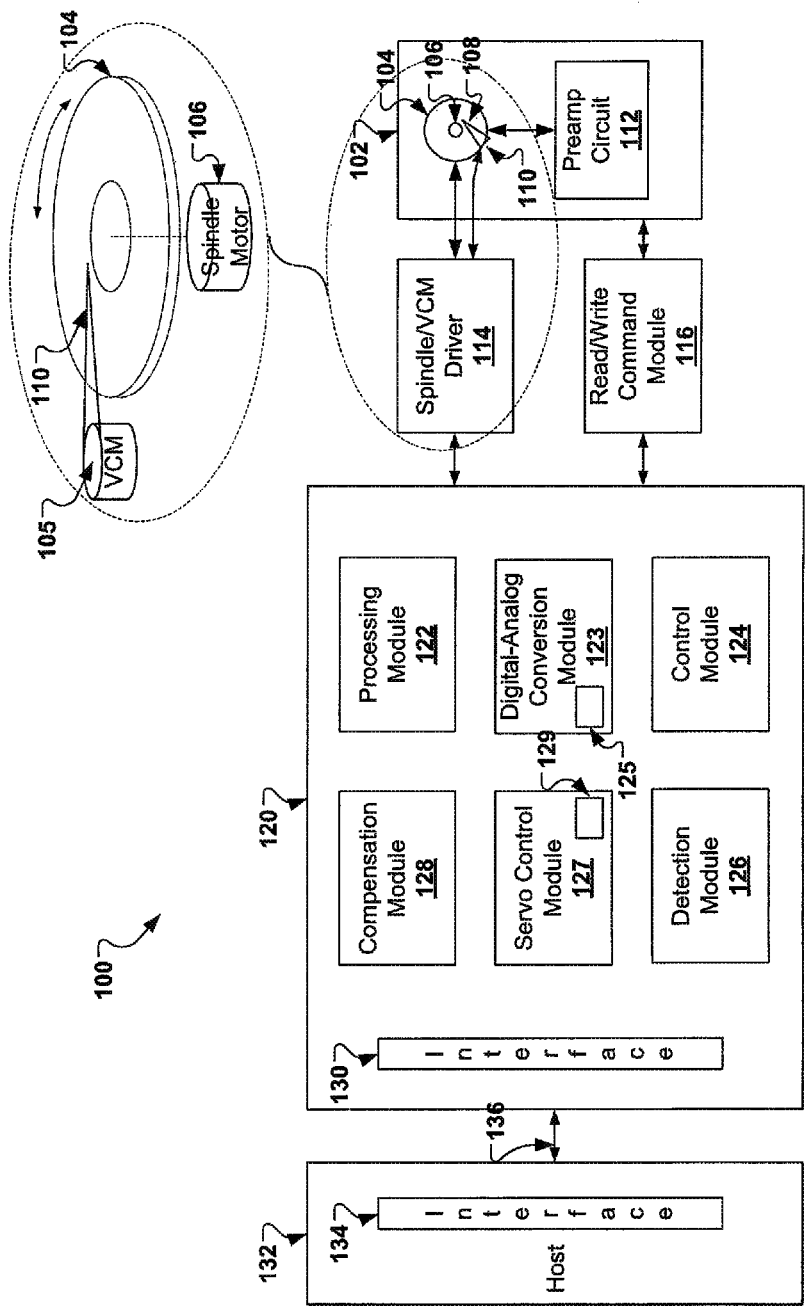
FIG. 1 shows an example hard disk drive (HDD) system.

FIG. 1 shows an example hard disk drive (HDD) system 100. As shown in FIG. 1, the HDD system 100 includes a printed circuit board (PCB) 120. The PCB 14 includes a processing module 122, a digital-analog conversion module 123 having a digital-analog converter 125, a control module 124, a detection module 126, a servo control module 127, a compensation module 128 and a communications interface 130, each of which is connected through one or more internal buses (not shown).

The processing module 122 may perform data and/or control processing related to the general operation of the HDD system 100. For example, the processing module 122 may execute instructions received from the control module 124 to control disk drive functions. These functions may include, for example, reading and decoding host commands, starting up and controlling the speed of the spindle motor 106, minimizing head positioning servo off track error through the control of the voice coil motor (VCM) 105, and managing power consumption of the HDD system 100.

The processing module 122 may include volatile memory (e.g., SDRAM or other types of low latency memory) for storing, for example, volatile control data associated with the control of the HDD system 100, and non-volatile memory (e.g., flash memory) for storing, for example, critical data such as non-volatile control code. The control data and control code may include instructions the processing module 122 executes or utilizes as well as tables, parameters or arguments used during the execution of these instructions. In some implementations, the processing module 122 also may store various firmware routines for controlling the operation of the spindle motor 106 such as, without limitation, startup routines, speed control routines, spin down routines and parking routines.

The processing module 122 may include registers and buffers for storing, for example, flags indicating whether a spin-up operation has been successfully completed. Alternatively, the flags may be stored in a register defined by a memory location in a memory unit separate from the processing module 122.

In some implementations, the processing module 122 may include a pulse width modulation (PWM) controller (not shown) for generating control signals so as to control the spindle/VCM driver 114 to drive the spindle motor 106 at a substantially constant speed while the disk drive is in use. The spindle/VCM driver 114 may receive VCM control signals from the PWM controller and generate a corresponding command signal to command the VCM 105 for positioning the actuator arm 110 and the read/write head 108, for example, as part of a parking operation. The VCM 105 may be controlled by the servo control module 127, and may be configured to apply torque to the read/write head 108 to swing the read/write head 108 during, for example, a track-seeking operation and to maintain the head 108 at a desired angular position during a track-following operation.

The spindle/VCM driver 114 may, in some implementations, include an electromotive force (EMF) detector (not shown) for detecting a back EMF (BEMF) associated with one or more windings of the spindle motor. The control module 124 may communicate with the spindle/VCM driver 114, for example, to receive zero crossing information to be used for identifying the instant at which a zero crossing occurs (e.g., a zero crossing in the BEMF induced in a floating winding), and for determining a spin-rate of the spindle motor. As an example, while the spindle motor 106 is rotating, the EMF detector may detect the BEMF zero crossing point for an un-driven winding to generate a zero crossing signal (e.g., by counting clock pulses and determining time elapsed between the consecutive detected zero crossings). The control module 124 may receive the zero crossing signal and provide information associated with the zero crossing signal to the processing module 122, for example, to compute the velocity of the spindle motor 106.

The control module 124 may function to manage and handle data transfer between the PCB 120 and the host 132 during read and write operations through the communications interfaces 130/134. The control module 124 also may include servo logic for managing the positioning of the read/write head 108 when seeking (e.g., moving from one track to a non-adjacent track) and during tracking (e.g., staying on a single track).

The control module 124 may communicate with the communications interface (e.g., an input/output interface) 130 and with the spindle/VCM driver 114 or the read/write command module 116. The control module 124 may coordinate control of the spindle/VCM driver 114, the read/write command module 116, the processing module 122, the compensation module 128 and the detection module 126.

The control module 124 may receive a command from the host computer 132 to generate a spin-up command while the spindle motor 106 is at rest to begin the spin-up mode of operation. The processing module 122 may receive the spin-up command from the control module 124 and retrieve an associated control routine for the spin-up mode of operation from a memory unit.

During write operations, the read/write command module 116 may encode (e.g., using, run length limited coding (RLL)) data to be written by the read/write head 108 and generate encoded write signals. The read/write command module 116 also may process the write signals providing a reliability check and may apply, for example, error correction coding (ECC) and similar algorithms to allow for the verification of the integrity of the data that is written. During read operations, the read/write head 108 may generate read signals (e.g., analog signals), and the read/write command module 116 may convert the analog read signals into digital read signals. The converted signals may be detected and decoded by conventional techniques to recover data written by the read/write head 108.

Hard Disk Drive Assembly

Signals between the HDD head assembly 102 and the PCB 120 can be carried, for example, through a flexible printed cable. The HDD head assembly 102 may include one or more magnetic disks or platters 104 for storing magnetic data. The platters 104 may be rotated by the spindle motor 106. The spindle motor 106 may rotate the magnetic platters 104 at a controlled speed during the read/write operations. The read/write actuator arm 110 may move relative to the magnetic platters 104 in order to read and/or write data to/from the magnetic platters 104. The spindle/VCM driver 114 may be configured to control the spindle motor 106, which rotates the magnetic platters 104. If desired, the spindle/VCM driver 114 also may generate control signals for positioning the read/write actuator arm 110 using the voice coil actuator 105, a stepper motor or any other suitable actuator.

The read/write head 108 may be located near a distal end of the read/write actuator arm 110. The read/write head 108 may include a write element (e.g., an inductor) that generates a magnetic field, and a read element (e.g., a magneto-resistive (MR) element) that senses the magnetic field on the magnetic platters 102.

The HDD head assembly 102 also may include a preamp circuit 112. The preamp circuit 112 may operate either in a read mode or write mode, and may communicate with one or more transducers (not shown). A transducer may generate a low level analog read signal, and send the analog read signal to the preamp circuit 112 to produce an amplified read signal. During a user-data read operation, the amplified read signal serially defines the servo information and user data. The servo information may include positioning data information such as track identification data information and fine positioning information. During a write operation, the preamp circuit 112 also may provide write current via a write data signal to a selected transducer for writing a sequence of symbols onto the magnetic platters 104. The write current changes polarity upon each change in the binary value of the write data signal.

In some implementations, portions of the HDD system 100 may be implemented as one or more integrated circuits (IC) or chips. For example, the processing module 122 and the control module 124 may be implemented in a single chip. As another example, the spindle/VCM driver 114 and the read/write command module 116 may be implemented in a same (or different) chip as the processing module 122 and the control module 124. As yet another example, the HDD system 100 other than the HDD head assembly 102 may be implemented as a system-on-chip.

In general, the spindle motor 106 may have different power requirements based on different operational configurations. For example, initial acceleration (e.g., during spin-up process) of the spindle motor 106 may require a high value of current relative to operation at steady-state velocity. As the spindle motor 106 reaches a desired operating velocity, the average motor current requirement may decrease substantially to maintain the head at a desired track.

Servo Control Module

Information may be stored on each platter 104 in concentric tracks. Data tracks may be divided into sectors. Information may be written to and/or read from a storage surface(s) of a disk by the read/write head 108. The read/write head 108 may be mounted on the actuator arm 110 capable of moving the read/write head 108, e.g., radially over the platter 104. The movement of the actuator arm 110 may allow the read/write head 108 to access different data tracks. The platters 104 may be rotated by the spindle motor 106 at a relatively high speed. The read/write head 108 may access different sectors within each track on the platter 104.

Operation of the actuator arm 110 may be controlled by the servo control module 127. The servo control module 127 may move the read/write head 108 according to two primary operations: seek control operation and track following operation.

In a seek control operation, the servo control module 127 controls the actuator arm 110 such that the read/write head 108 may be transitioned from an initial position to a target track position for which the host 132 has requested. A seek control operation generally includes accelerating, decelerating and settling the VCM 105 at a predetermined speed. In general, the servo control module 127 may initiate a seek control operation when the host 132 issues, for example, a seek command to read data from or write data to a target track on the platters 104.

As the read/write head 108 approaches a target track, the servo control module 127 may settle the actuator arm 110. During settling, the servo control module 127 may bring the head 108 to rest over a target track within a selected settle threshold or window, which may be based on a percentage of the track width from the center of the track. The servo control module 127 may employ, for example, a pre-loaded algorithm, to ensure that the head 108 is positioned on the target track with sufficient accuracy to write (and read). This process may require counting servo position samples occurring within the settle window. For example, a write operation may be initiated after observing one or more consecutive positioning samples that are within certain area of a data track. Of course, a wide variety of settle criteria may be employed, in ensuring positioning accuracy.

After the head 108 is settled over a desired track, the servo control module 127 may initiate a track following mode. In the track following mode, the head 108 may be positioned and maintained at a desired position with respect to the target track (e.g., over a centerline of the track) or over a defined radial location along a track on the disk until desired data transfers are complete and another seek is performed, as will be discussed in further detail below.

The digital-analog conversion module 123, which includes a digital-analog converter 125, can operate to convert data between the digital form used by the PCB 120 and the analog form conducted through the head 108 in the HDD head assembly 102. The HDD head assembly 102 can provide servo position information read by the head 108 to the servo control module 127. Servo sectors on each of the platters 104 can include head location information, such as a track identification field and data block address, for identifying a target track and data block, and burst fields to provide servo fine location information. The head location information read by the head 108 may be converted from analog signals to digital data by the digital-analog converter 125, and fed to the servo control module 127. The servo positional information can be used to detect the location of the head 108 in relation to a target track or target data sectors on the platters 104. The servo control module 127 may utilize, for example, target data sectors and servo position information to precisely place the head 108 over the target track and data sector on the platters 104, and to continuously maintain the head 108 aligned with the target track while data is written/read to/from one or more identified data sectors.

The digital-analog conversion module 123 may include a digital-analog converter (DAC) 125 for converting control signals (e.g., for controlling the position of the head 108) generated by the control module 124 into analog signals (and from analog signals into digital data). For example, a head position signal may be generated by the control module 124 and provided to the DAC 125. The DAC 125 then may convert the head position signal into an analog signal (e.g., a voltage signal) for driving the VCM 105 coupled to the actuator arm 110. The actuator arm 110 may subsequently move the head 108 along the surface of the platters 104 based on the analog signal provided by the DAC 125.

In some implementations, the DAC 125 may be configured to output, for example, different analog voltage ranges to account for resolution needs at different operating conditions. In these implementations, the DAC 125 may have one or more selectable modes. For example, the DAC 125 may utilize certain modes (i.e., referred to here as "higher modes") to provide a larger voltage range and bigger current scale but at a lower resolution (volts/digital count). In these implementations, higher modes may be used, for example, during seeking control operations where a large voltage range is generally desirable. Conversely, the DAC 125 may employ other modes (i.e., referred to here as "lower modes") to provide a higher resolution (e.g., smaller voltage steps per digital count). Lower modes may be used, for example, for tracking following operations where high resolution is critical to servo tracking performance.

Servo Controller and Self-Servo-Writing Controller

In some implementations, the servo control module 127 may include a servo controller 129 to control mechanical operations related to servo processing, such as, but not limited to, head positioning (e.g., through the HDD head assembly 102) and rotational speed control (e.g., through the VCM 105). The servo controller 129 may include one or more IC chips (e.g., a combo chip), which can include read/write channel signal processing circuitry 170. The servo controller 129 also may include a microprocessor and a hard disk controller. The drive electronics hosting the controller 129 also may include various interfaces, such as a host-bus interface, and memory devices, such as a read only memory (ROM) for use by a microprocessor, and a random access memory (RAM) for use by the controller 129.

In some implementations, the servo controller 129 may be a self-servo-write controller that manages servo information and how these servo information are to be written on a machine-readable medium. The servo controller 129, in these implementations, may be integrated into a device, such as the read/write head 108. In other implementations, the self-servo controller 129 may be integrated into the processing module 122, the control module 124, the preamp circuit 112, or combinations thereof (e.g., in implementations where the processing and control modules 122 and 124 and the preamp circuit 112 may be combined into a single integrated circuit).

Servo Wedge

In some implementations, servo information on a platter may be written as a plurality of servo wedges 202 that extend radially from an inner diameter (ID) of the platter to an outer diameter (OD) of the platter. The servo wedges 202 may be equally spaced about the circumference of the platter surface.

A servo wedge 202 may include servo patterns written thereon. Servo patterns contained in each servo wedge may be read by the read/write head 108 as the disk surface passes under/over the read/write head 108. The servo patterns may include information identifying a data field. For example, the servo pattern may include, without limitation, a sync field, a servo address mark, track identification (e.g., gray coded track number), an index, offset bursts and the like.

In some implementations, additional information such as partial or complete wedge number information also may be included in the servo patterns. In some implementations, the read/write head 108 may be enabled to write the servo patterns (including additional information) prior to, subsequent to, or contemporaneously with writing servo patterns on some or all of the remaining regions of the platter.

In sum, servo patterns may provide the HDD 100 with head position control information to control the actuator arm 110 to move the head 108 from starting tracks to destination tracks during random access track seeking operations. Further, the servo patterns may provide the HDD 100 with head position control information to control the actuator arm 110 to position and maintain the head 108 in proper alignment with a track during track following operations when user data is read from or written to data sectors in the concentric tracks on the disk surface.

Figure 2:
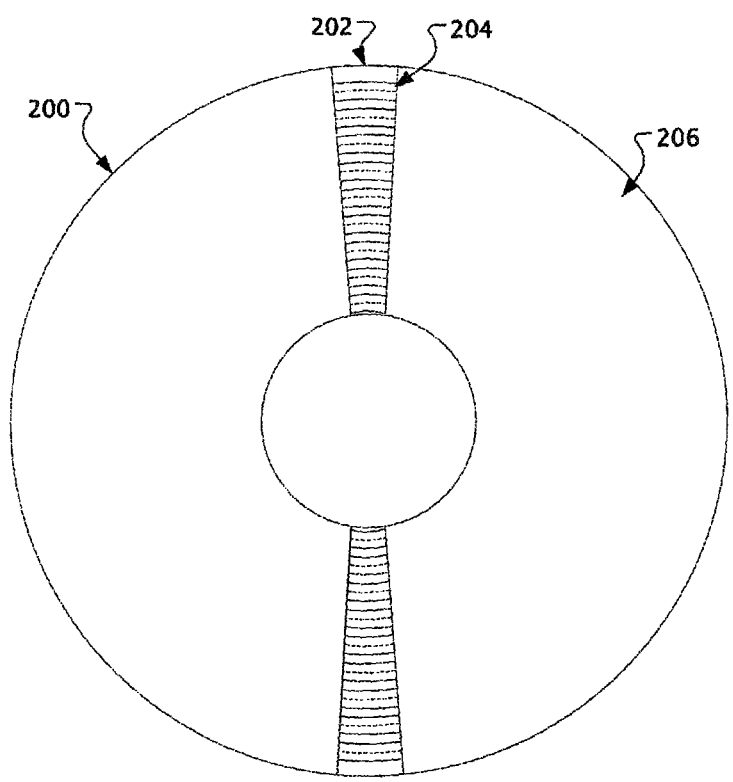
FIG. 2 shows an example disk having servo information written thereon.

FIG. 2 shows an example disk 200 having servo information written thereon. Referring to FIG. 2, a disk 200 with a plurality of servo wedges 202 are shown. The servo wedges 202 may be interspersed between a corresponding number of wedge-shaped data regions or data wedges 206. For sake of brevity and simplicity, only two servo wedges 202 are shown. However, one skilled in the art would readily understand that there can be more than two servo wedges (e.g., from 90 to 100 servo wedges).

Generally, servo information may be written in the form of a plurality of servo sectors 204. The servo sectors 204 may precede a corresponding number of data wedges 206 used to record data tracks. Data tracks may be divided into a plurality of data sectors, and may be formatted in radial zones. Radial zones radiating outwardly from the ID to OD can be written at progressively increased data frequencies to take advantage of an increase in linear velocity of the disk surface directly under the read/write head 108 in the respective radial zones. The servo wedges 202, in some implementations, may not extend linearly from the ID to the OD, but may be curved slightly (e.g., in a form of a spiral) in order to adjust for the trajectory of the read/write head 108 as the head 108 sweeps across the disk 200.

The servo control module 127 may use the servo wedges 202 to read or write servo information as well as data tracks. In some implementations, the servo control module 127 may use one or more spirals to write the servo information, as will be discussed in greater detail below.

In some implementations, before performing a read/write operation on a section of a given track, the read/write head 108 may lock onto a desired track by referring to positioning information contained in a given servo wedge 202. By writing the servo wedges 202 onto a disk, the servo wedges 202 provide the positioning information necessary to allow the read/write head 108 to read and write data at the correct locations on the disk. In this instance, data can be correctly read and/or written if servo information is written properly and precisely.

As briefly discussed in the Background, servo information may be pre-recorded on a disk using servo writers. A servo writer can include a high precision encoder and a mechanical pushpin. The movement of the mechanical pushpin (which is attached to an actuator arm) is controlled by the high precision encoder and other internal hard drive components. The servo writer controls the position of the head in the radial direction of the disk by the mechanical pushpin, and writes a reference servo signal of the disk. Conventional servo writers, however, are expensive in cost, slow in speed and large in size, all of which can contribute to an increase in the overall cost of manufacturing HDDs. These conventional servo writers further become less compatible with the current industrial needs as the requirement for high recording density, compact size and large storage capacity of the hard disk drive becomes more stringent.

In some implementations, a self-servo-writing process may be utilized for writing servo information instead of using external servo writing applications or devices such as servo writers. In some implementations, the self-servo-writing process may include first writing reference information (e.g., reference spirals) on a disk and writing servo information on the disks by referring to the reference information previously written. More specifically, the reference information may include a reference servo sector. When writing servo information using the self-servo-writing process, the read/write head 108 may be locked onto the reference servo sector. The reference servo sector may be written as reference spirals (e.g., a servo sector written in the form of a spiral shape), and servo information may subsequently be written by referring to the reference spirals (e.g., by extracting position control information from the reference spirals).

Figure 3:
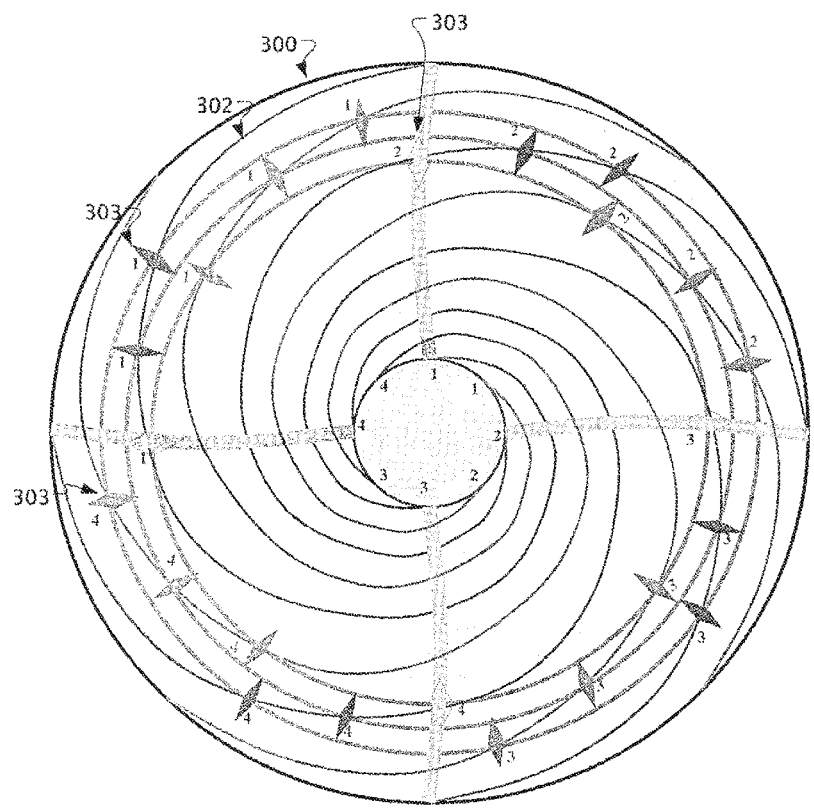
FIG. 3 shows an example of spiral patterns on a reference disk.

FIG. 3 shows an example of spiral patterns of a reference spiral on a reference disk 300. As shown, the disk 300 includes a reference spiral 302 with spiral reference patterns written thereon. In some implementations, the spiral reference patterns may be crash-stop spiral patterns. Crash-stop spiral patterns may help define the mechanical limits of the actuator arm 110 so that the arm 110 does not move beyond its limits which could damage both the disk 300 and the HDD 100. The reference spirals may each extend (e.g., in segments) from substantially the ID to substantially the OD of the reference disk 300. In some implementations, the reference spirals may all be read by the read/write head 108 at a constant radius during a single revolution of the reference disk 300.

The HDD 100 may use one of the reference spirals, for example, during a self-scan process to servo the read/write head 108 for self-servo writing servo wedges. In some implementations, the HDD 100 may lock onto a reference spiral using conventional position detection techniques, slew to a starting point of the reference spiral, write a portion of servo information in the servo wedges, seek a new track, and write the next portion of servo information in the servo wedges. The reference spiral 302 also may be used (e.g., during track following operations) to assist in identifying the relative position of the read/write head 108 as the disk 300 rotates under the head 108. In some implementations, residual adjustment (e.g., associated with positioning the read/write head 108) can be accumulated and performed across many tracks while the self-servo writing proceeds.

Self Servo Writing Overview

Generally, a self-servo-writing process includes one or more reading and writing operations. Subsequently, servo information, which is used in the read/write operations of the user data, may be written onto the entire surface of the platter. The servo information may further be used to write additional servo information, as will be discussed in greater detail below.

In some implementations, during a self-servo-writing process, the read element of the head 108 reads out written servo information from a servo wedge closer to the ID while the write element of the head 108 writes new servo patterns closer to the OD. More specifically, the read element may lock onto a reference spiral while the write element writes new servo information after, for example, obtaining timing and position information from the reference spiral. Servo information may be written onto the entire surface of the disk by moving the head 108 radially between the ID and the OD.

The read element of the head 108 may be located closer to the ID of the platter than the write element. Since writing servo information may start from a position closer to the ID, the read element may sequentially lock onto a reference spiral, read out, for example, position control information from the reference spiral, locate a region on the track for which servo information is to be written, and subsequently write the servo information using the write element. The circumferential positions of the read and write elements are not limited, and that the self-servo-writing process also may begin from the OD of the platter by, for example, switching the positions of the read element and the write element.

Example of a Self Servo Writing Process

FIGS. 4A-4G show an example self-servo-writing process for writing reference spirals and servo information. To initiate a self-servo-writing process, the actuator arm 110 may be accelerated to a target radial velocity. The reference spirals may then be written while maintaining the target radial velocity.

Generally, a first band of reference spirals may first be written. The first band of reference spirals may assist in writing one or more servo wedges each including servo information having, for example, servo timing information for providing relative circumferential and radial position control information for the read/write head 108. The first band of reference spirals also may be used to provide position and timing reference information for self-servo-writing of a section or portion of the servo wedges. The servo wedges written in this manner may cover a specific radial range.

Then, another band of reference spirals may be written, with the starting radius located, for example, on one of the written servo patterns (i.e., to serve as the bootstrapped position). This second band of reference spirals may then be used to extend the already-written servo information further (i.e., to write a second portion of the servo wedges) toward the outer diameter of the disk. This process, in some implementations, may be continued until the whole disk is written with all necessary final servo information in the servo wedges. Several bands of spiral patterns may be required.

Figure 4A:
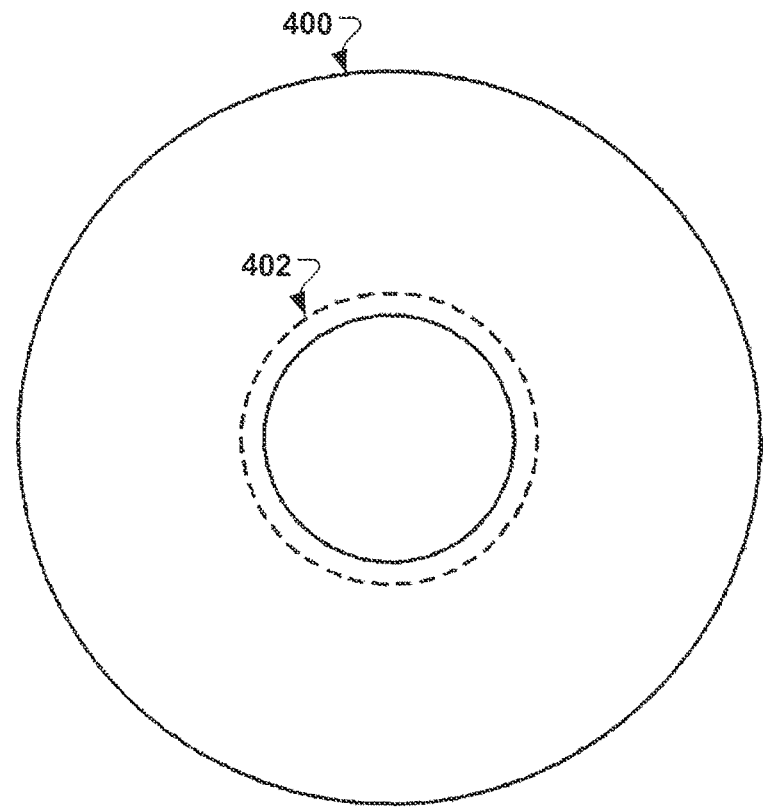
FIGS. 4A-4G show an example self-servo-writing process for writing spiral patterns and final servo information.

Referring to FIG. 4A, in some implementations, a timing track 402 may be written on a platter 400. The timing track may contain a timing reference to facilitate the initial placement of the read/write head 108. In some implementations, the write operation of the timing track may be optional and may be bypassed depending on the specific design and application.

Figure 4B:
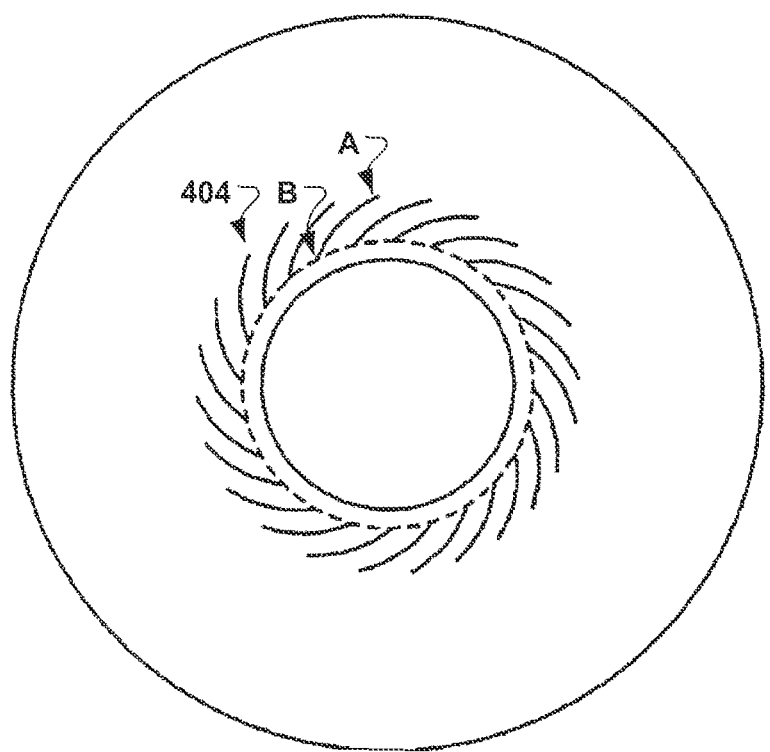

After writing the timing track 402, a first band of spiral reference patterns 404 may be written on the platter 400 extending from the timing track 402, as shown in FIG. 4B. In implementations where the timing track 402 is omitted, the first band of spiral reference patterns 404 may be written on the platter 400 starting from the ID of the platter 400.

Figure 4C:
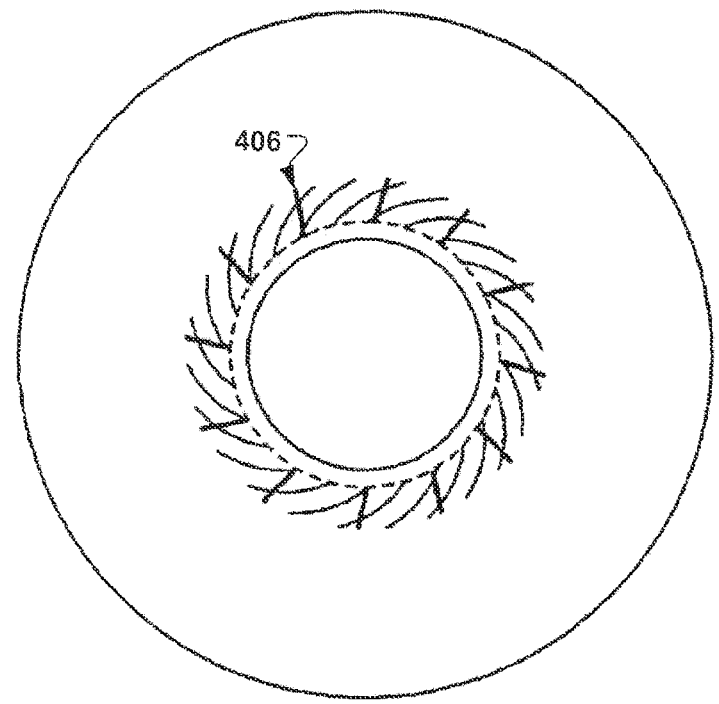
Figure 4D:
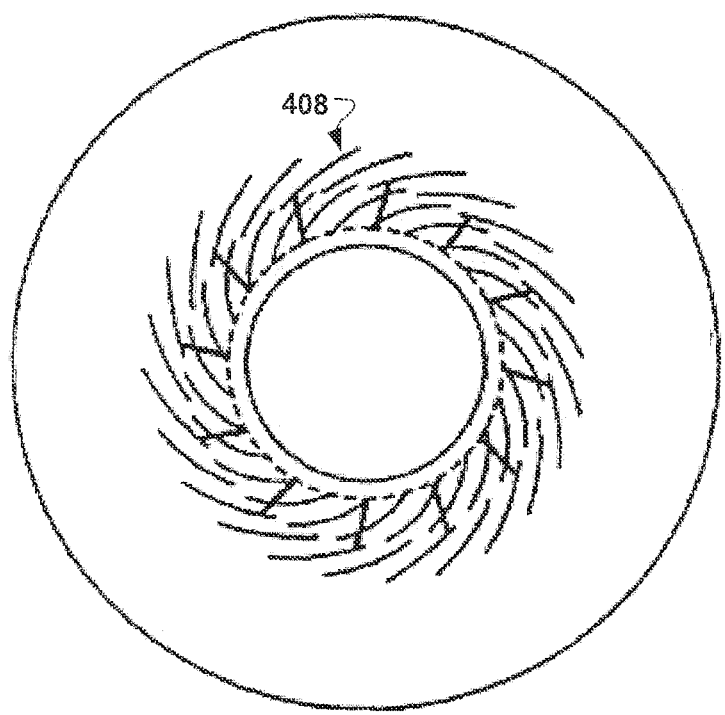
Figure 4E:
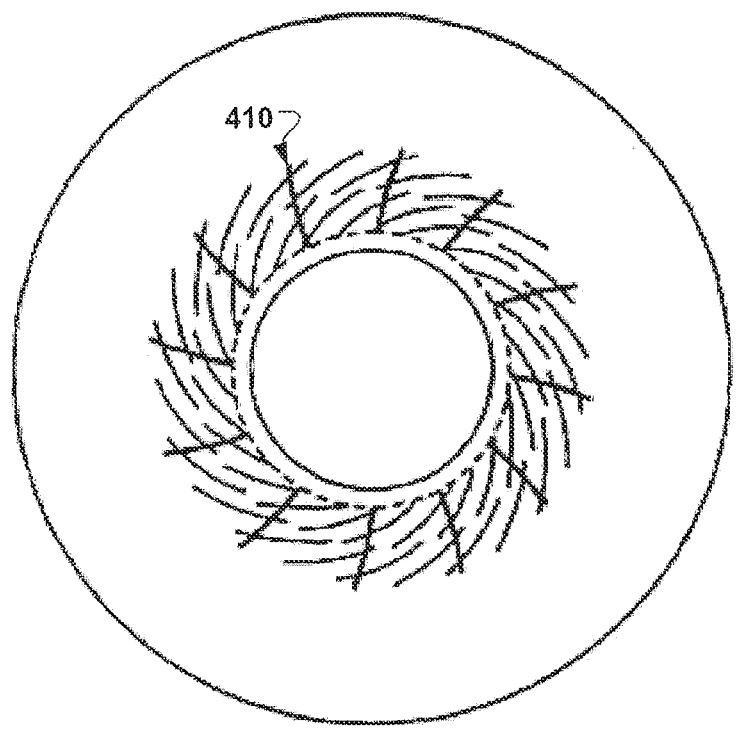
Figure 4F:
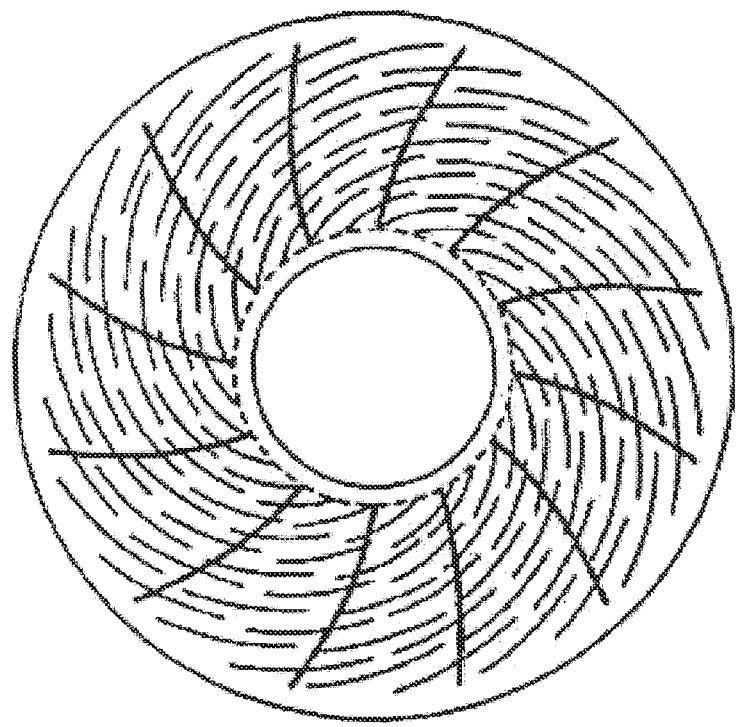

Once the first band of spiral reference patterns 404 is written, a first portion of the servo information 406 including servo wedges may be written using, for example, the timing and position control information provided by the first band of spiral reference patterns as a reference, as shown in FIG. 4C. Thereafter, the remaining servo information may be written using the first portion of the servo information. In other words, the general self-servo-writing process may include, iteratively, writing a next band (e.g., a second band) of spiral reference patterns using a previously-written portion (e.g., a first portion) of the servo information as a reference, and writing a next portion (e.g., a second portion) of the servo information using a previously-written band (e.g., the second band) of spiral reference patterns as a reference. For example, as shown in FIG. 4D, a second band of spiral reference patterns 408 may be written (e.g., in an overlapped and staggered fashion). FIG. 4E shows a second portion 410 of the servo information including servo wedges being written on the platter 400. FIG. 4F shows the disk 400 with all the spiral reference patterns and servo information being written thereon.

As shown in FIGS. 4A-4F, each band of the spiral reference patterns (hereinafter spiral band) need not extend all the way to the other edge of the disk. For example, each spiral band may span less than half, less than third, less than fourth, or less than eighth of a distance from the ID to the OD of the disk. In some implementations, the span of a spiral band may be less than or equal to one thousand final servo tracks, less than or equal to one hundred final servo tracks, or in the range of three to ninety final servo tracks.

Detecting the End of a Spiral Band

Performing a self-servo-writing process may include writing and reading spiral reference patterns using a non-overlapping approach or an overlapping approach. In a non-overlapping approach, servo information may be written beyond the end of the first spiral band. Specifically, the read/write head 108 may track follow on a first spiral band while writing a portion of the servo information until the end of the first spiral band has been reached. For example, temporarily referring to FIG. 4G, a band of spiral reference patterns 412 may be written on the platter 400. Based on the written servo information, a second spiral band of spiral reference patterns may be launched (e.g., continuing from or substantially near the first spiral band). The read/write head 108 then uses the second spiral band to write the remaining portion of the servo information (e.g., continuing from the previously-written portion) until the end of the second spiral band has been detected.

By precisely detecting the terminal end (e.g., the radial location) of each spiral band and continually writing a next spiral band beginning from the terminal end, the self-servo-writing process ensures that extraneous writings, which may cover overlapping information, and the writing time associated with the extraneous writing are minimized.

Example Process for Generating a Running Average Value

Figure 5:
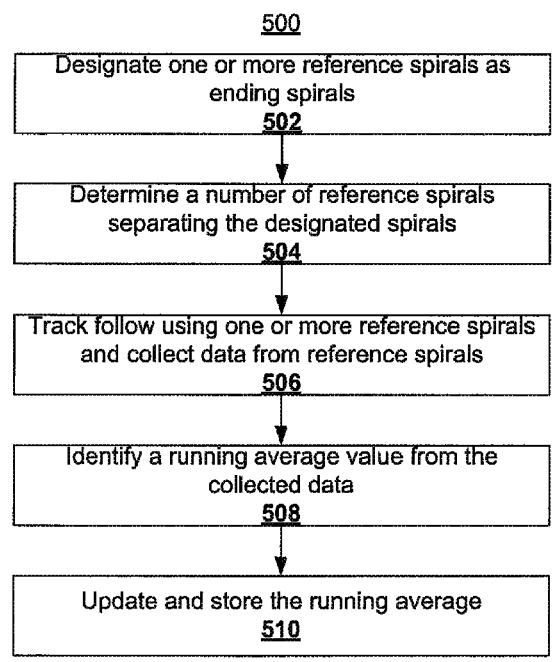
FIG. 5 shows an example process for determining a running average value.

In some implementations, a running average value may be used to detect an end of a spiral band. FIG. 5 shows an example process 500 for generating such a running average value. Process 500 may be performed, for example, by the HDD system 100, and for clarity of presentation, the description that follows uses the HDD system 100 as the basis of examples for describing the process 500. However, another apparatus, system, or combination of systems, may be used to perform the process 500.

Referring to FIG. 5, to determine the terminal end of a spiral band (e.g., where the band ends such that a new band may be launched), a running average value may first be determined. The running average then may be used as a threshold value for comparing among the reference spirals to identify, for example, a reference spiral that may have been written with a predetermined length. In these implementations, the identification of the reference spiral written with a predetermined length may be used as an indicator that a potential end of a spiral band has been reached, as will be discussed in greater detail below.

Figure 4G:
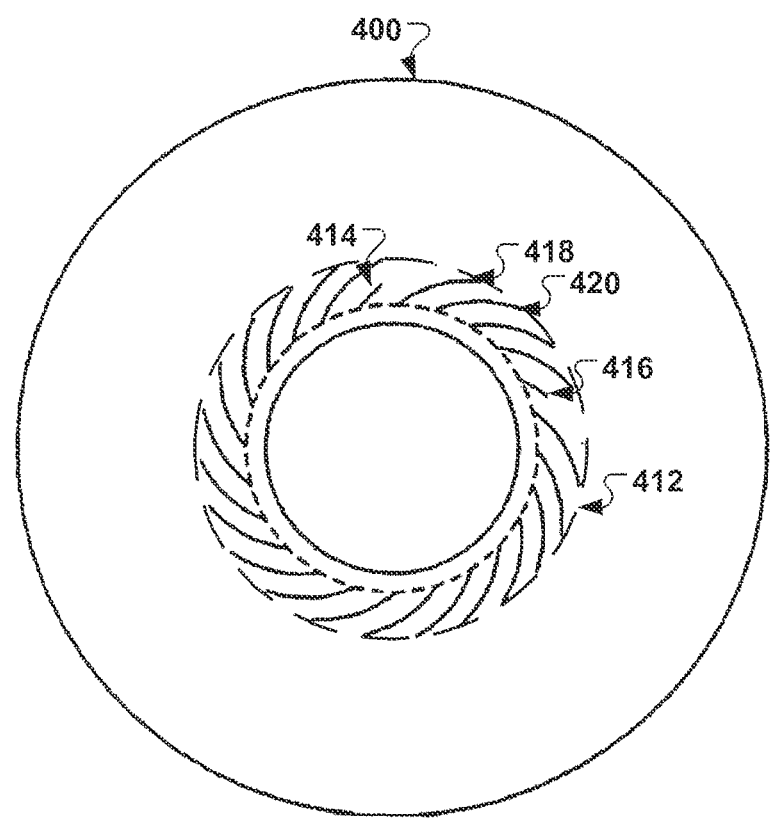

As shown in FIG. 5, process 500 begins with designating one or more reference spirals as ending spirals (502). In some implementations, designating one or more reference spirals as ending spirals may include specifying one or more reference spirals to be written, for example, with a length shorter than other reference spirals in the same band. In these implementations, the servo controller 129 may instruct the read/write head 108 to execute such a writing instruction while writing the first band of spiral reference patterns. For example, the servo controller 129 may designate the $10^{th}$ reference spiral as an ending spiral whose length is 0.5% shorter than other reference spirals, and the read/write head 108 may receive the designation as a command to write a first band of twenty four reference spirals with the $10^{th}$ reference spiral being shorter in length than the other reference spirals (i.e., shorter than the $1^{st}$ through $9^{th}$ and $11^{th}$ through $24^{th}$ reference spirals). As another example, the servo controller 129 may designate the $20^{th}$ reference spiral and the $40^{th}$ reference spiral with a length longer than other reference spirals in a band of 100 reference spirals. As yet another example, temporarily referring to FIG. 4G, reference spirals 414 and 416 may be the designated ending spirals with a length shorter than other reference spirals (e.g., shorter than reference spirals 418 and 420). Of course, FIG. 4G is merely illustrative, and that a greater or lesser number of reference spirals (e.g., more than 200 reference spirals or less than 10 reference spirals) may be used.

The examples provided above (and below) generally refer to geometrical length as a criterion for determining an end of a spiral band. For example, when the read/write head 108 is at the end of a reference spiral, the head 108 may only cover a part of the reference spiral, and when the head 108 is farther away from the end toward the OD the head 108, the head 108 may no longer cover the reference spiral. In other words, as the head 108 moves away from the end of a reference spiral, the magnitude drops from a full value to near zero. Accordingly, the term "magnitude" should not be confused with the length of a reference spiral, but rather the term "magnitude" refers to the magnitude of a reference signal detected as the read/write head 108 approaches a reference spiral. The magnitude of a reference signal associated with a reference spiral may be different from those associated with other reference spirals, as each reference spiral may not necessarily be written identically (e.g., with a same length). In other implementations, rather than using magnitude as a criterion, other characteristics (e.g., track pitch, spiral slope, etc.) also may be used as criteria for determining potential ending spirals.

Next, a determination is made as to the number of reference spirals separating the designated ending spirals (504). Using the foregoing examples, the servo controller 129 may determine that a total of 20 reference spirals separates the $20^{th}$ reference spiral from the $40^{th}$ reference spiral. In implementations in which only one ending spiral has been designated, operation 504 may be bypassed. In other implementations where only one ending spiral has been designated, the servo controller 129 may use the first reference spiral in a spiral band as a reference point, and may determine the number of reference spirals based on the separation between the one designated ending spiral and the reference point. For example, assuming that the $10^{th}$ reference spiral has been designated as an ending spiral, the servo controller 129 may determine that a total of eight reference spirals separates the $10^{th}$ spiral from the $1^{st}$ spiral (i.e., when using the $1^{st}$ spiral as the reference point).

Thereafter, track following a reference spiral while collecting data from the reference spiral can be initiated (506). In some implementations, collecting data may include collecting magnitude data associated with a reference signal. Specifically, as discussed above, as the read/write head 108 approaches a reference spiral, a reference signal may be generated which indicates, for example, the presence of a reference spiral. As the read/write head 108 sweeps past the reference spiral, the magnitude of the reference signal becomes increasingly large until the time at which the read/write head 108 is positioned entirely over the reference spiral (which is at the maximum). Beyond this point, the reference signal becomes weaker as the read/write head 108 moves beyond the reference spiral and is at its weakest when the read/write head 108 is completely away from the reference spiral. In some implementations, the reference spiral may include reference data (e.g., timing or position control information) that allows the read/write head 108 to write servo information on the track being track-followed.

As discussed above, collecting data may include collecting magnitude data associated with a reference signal. In some implementations, the magnitude of the reference signal beginning from, for example, the time when the read/write head 108 approaches the reference signal until the time when the read/write head 108 is completely removed from the reference signal may be collected (e.g., in real time) as data. In sum, when plotted, the magnitude of the reference signal yields a substantially diamond-shaped curve with respect to time, where the curve gradually increases as the read/write head 108 approaches a reference spiral, and gradually decreases as the read/write head 108 gradually moves beyond the reference spiral. In some implementations, the area bounded by the diamond-shaped curve may be used to define the extent of the magnitude. Data associated with the magnitude then may be stored in a local cache or memory so that such data can be continuously collected as the read/write head 108 moves from spiral to spiral.

In some implementations, the reference signal may be used to adjust (or re-adjust) the position of the read/write head 108. Specifically, using the "peak" (or maxima) of the reference data (e.g., where the peak occurs when the read/write head 108 is entirely over a reference spiral) and the timing information associated with the peak, the position of the read/write head 108 (e.g., with respect to the disk or a track) may be determined. In some implementations, if it is determined that the peak (e.g., as shown by the diamond-shaped curve) occurs too early, which infers that the read/write head 108 is positioned towards the inner diameter of the disk away from an intended track, the current supplied to the spindle motor 106 may be altered so as to reposition the actuator arm 110 back toward the intended track (e.g., toward the outer diameter by a certain degree).

After collecting data (e.g., magnitude data) associated with the reference signal, a running average value can be identified (508). In some implementations, the running average value is determined after a predetermined number of reference signals have been detected. In some implementations, the reference signal generated as the read/write head 108 approaches a subsequent reference spiral may be combined with the reference signal collected from the preceding spiral(s). For example, the read/write head 108 may collect data associated with the $1^{st}$ reference spiral and the $2^{nd}$ reference spiral, and subsequently combine the collected data associated with the $2^{nd}$ reference spiral with that associated with the $1^{st}$ reference spiral.

In some implementations, identifying a running average value may include averaging the collected data by the number of associated reference spirals. The averaged data may then be used as a threshold with which other spirals may be compared. Specifically, as the read/write head 108 moves across multiple reference spirals, the reference signal generated for each spiral may be compared against the running average value to determine whether the magnitude of the reference spiral has fallen below the average value. By doing so, one (or more) of the designated spirals (e.g., those that fall below the average value) may be identified, as will be discussed in greater detail below with respect to FIG. 6.

In some implementations, identifying a running average value also may include determining the area bounded by the diamond curve associated with the magnitude of the reference signal, and comparing the area against the running average value.

Subsequently, the running average value may be updated, e.g., continuously, as the read/write head 108 sweeps across various reference spirals (if one is already existing) and stored so that the running average value can be retrieved for future comparison (510). Similar to the reference data which provides, for example, position and control information, the running average value also may be stored in a local cache or memory for future retrieval.

In some implementations, operations 502-510 may be performed in the order listed, in parallel (e.g., by the same or a different process, substantially or otherwise non-serially), or in reverse order to achieve the same result. In other implementations, operations 502-510 may be performed out of the order shown. Also, the order in which the operations are performed may depend, at least in part, on what entity performs the method. Operations 502-510 further may be performed by the same or different entities or systems.

Example Process for Detecting a Spiral Band End Using a Running Average Value

Figure 6:
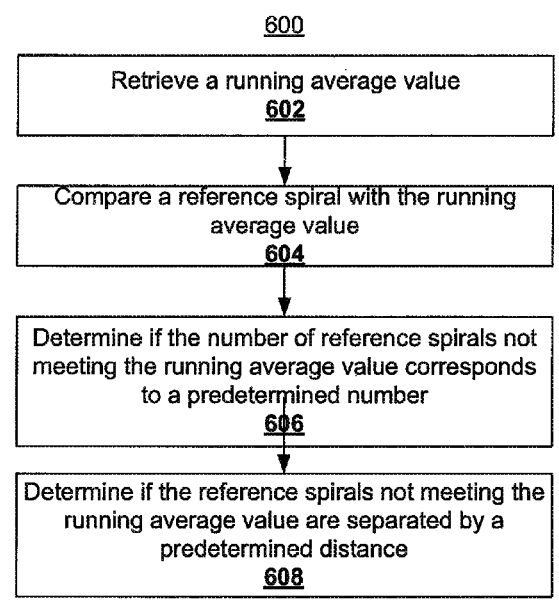
FIG. 6 shows an example process for detecting the end of a spiral band using a running average value.

FIG. 6 shows an example process 600 for detecting the end of a spiral band using a running average value. Similar to process 500, process 600 also may be performed, for example, by the HDD system 100, and for clarity of presentation, the description that follows uses the HDD system 100 as the basis of examples for describing the process 600. However, another apparatus, system, or combination of systems, may be used to perform the process 600.

Process 600 begins with retrieving a running average value (602). The running average value may be retrieved from the same location where it was stored in the performance of process 500. The retrieved running average value may then be used to determine whether a reference spiral meets the threshold corresponding to the running average value (604). For example, assuming that the read/write head 108 detects the presence of the $20^{th}$ reference spiral, then the servo controller 129 may compare the magnitude data associated with the $20^{th}$ reference spiral against the running average value. This operation may be a preliminary step in determining whether the detected spiral corresponds to the reference spiral being designated (e.g., as designated in step 502 of FIG. 5) as an ending spiral.

A reference spiral in a single band may make multiple revolutions around the platter. In some implementations, if the magnitude of the reference spiral (as collected from the reference signal) does not meet the running average value, then the servo control module 127 may determine that the reference spiral is different from those previously detected by the read/write head 108. In this instance, a determination may be made if the reference spiral also was "missing", for example, in a previous revolution. More specifically, if the comparison shows that the magnitude data associated with the $20^{th}$ reference spiral also missed the threshold in a previous revolution, then the $20^{th}$ reference spiral may be flagged as an ending spiral. Conversely, if the magnitude data associated with the $20^{th}$ reference spiral was above the threshold in a previous resolution but fails to pass the threshold in a current revolution, then the read/write head 108 may flag the reference spiral as a potential ending spiral but still use the reference data associated with the reference spiral to write a next portion of the servo information. Subsequently, if the same reference spiral misses the threshold in a next revolution, then the reference spiral may be flagged as an ending spiral. Conversely, if the same reference signal passes the threshold in a next revolution, which indicates that the previous failure was likely due to, for example, manufacturer defect, mechanical imperfection or system noise, then the reference signal associated with the reference spiral may be used to write a next portion of the servo information.

In general, this additional verification process helps to ensure that a reference spiral fails to meet the threshold due to its actual magnitude, and not due to manufacturing defect, mechanical imperfection, signal noise or damage of the disk. Because reference spirals may not be perfectly written with identical magnitude and may deviate by a few tracks during writing, this additional verification process further ensures that the failure to meet the threshold is not contributed by this minor deviation. Thus, in some implementations, if a particular reference spiral was also missing from the previous resolution, then this reference spiral may properly be construed as one designated to be an ending spiral (e.g., because it was written with a shorter length) and may be flagged as an ending spiral. In these implementations, if two reference spiral have been designated as ending spirals but only one reference spiral with a low amplitude (recalling that magnitude or amplitude of a reference spiral indicates a signal amplitude associated with the reference spiral and not the geometrical length of the reference spiral) has been detected, writing (and/or reading) may continue until a second reference spiral is found.

In some implementations, upon detecting an ending spiral, the writing of spiral servo terminates. In implementations where more than one reference spiral has been designated as ending spirals, the writing of servo information terminate when all of the designated spirals have been identified. In some implementations, a detection time also may be implemented. The detection time may be used to determine whether to continue with identifying designated ending spirals. For example, if the detection time has not expired, operation 604 may be repeated on a different reference spiral until the detection time expires.

If a reference spiral was detected (i.e., not "missing") in a prior revolution, which indicates that the failure to meet the running average value is likely due to a minor deviation in track length (e.g., by several tracks), then the reference spiral may be monitored. By monitoring the reference spiral, for example, in the next cycle, the servo controller 129 may ensure that the deviation was natural, and not intended (e.g., as in those designated with a shorter length).

As discussed above, in some implementations, a detection time may be used to determine whether operation 604 should be repeated. A detection time may be used to extend the writing of the servo tracks. In these implementations, instead of marking the end of reference spirals based on spiral magnitude (e.g., based on short spirals), the reference spirals may be marked "earlier" (e.g., few tracks shorter by five to ten tracks) and the detection time may be used to add these tracks back to the reference spirals. These few tracks, which in essence indicate a diction time, may be optimized, in some implementations, based on various performance factors of the disk drive. In other implementations, the detection time may depend on the number of reference spirals designated as ending spirals so as to provide sufficient time for the servo controller 129 to detect the ending spirals. If it is determined that the detection time has not expired, the read/write head 108 may, for example, continue to track follow a different reference spiral and compare its magnitude data against the running average value.

If the detection time has expired, the number of reference spirals not meeting the running average value (e.g., those that have been flagged) is determined (606). A check is made to determine if the number is equal to a predetermined number. In some implementations, the number of spirals designated as ending spirals (e.g., those determined in operation 502) may be used as the predetermined number. For example, assuming that the servo controller 129 previously designated two reference spirals as ending spirals, then determining whether the number of reference spirals not meeting the running average corresponds to a predetermined number includes determining whether there are two spirals having been flagged as ending spirals. If the number does not correspond with the number of reference spirals designated as ending spirals (e.g., where there is one flagged spiral when there are two reference spirals designated as ending spirals), then operation 604 may be repeated until a time at which the number of reference spirals not meeting the running average corresponds to the number of reference spirals designated as ending spirals.

When the number of flagged spirals matches that of the reference spirals designated as ending spirals, a determination is made if the flagged spirals are separated by a predetermined distance (608). In some implementations, the number of spirals separating the designated spirals (e.g., the distance as determined in operation 504) may be used as the predetermined distance. For example, assuming that the $1^{st}$ reference spiral and the $10^{th}$ reference spiral have been designated as ending spirals, indicating that a total of nine reference spirals separate the $10^{th}$ reference spiral from the $1^{st}$ reference spiral, then nine reference spirals may be used as the predetermined distance.

By verifying that the flagged spirals are separated by the correct distance, process 600 ensures that the appropriate spirals have been flagged (e.g., as opposed to those that are mistakenly construed due to minor deviation in track length). When it is determined that a correct distance separates the flagged spirals, then process 600 may conclude that the end of the spiral band has been detected. Subsequently, the servo controller 129 may identify the radial or circumferential position of the spiral band from which a new band of spirals may be launched.

In some implementations, operations 602-608 may be performed in the order listed, in parallel (e.g., by the same or a different process, substantially or otherwise non-serially), or in reverse order to achieve the same result. In other implementations, operations 602-608 may be performed out of the order shown. For example, process 600 may determine the distance separating the flagged spirals prior to determining whether the number of flagged spirals corresponds to the number of spirals designated as ending spirals. Also, the order in which the operations are performed may depend, at least in part, on what entity performs the method. Operations 602-608 further may be performed by the same or different entities or systems.

Timing and Position Control Information

As discussed above, servo information may be written using the timing or position control information provided by the reference spirals. Because the position of the read/write head 108 may shift during operation, it is important that the read/write head 108 is maintained at a correct position when reading out the timing and position control information from a reference spiral and writing the servo information. Because the timing and position control information read out from the reference spirals may be used to write the servo information, in some implementations, repeatable runout (i.e., position errors that repeat over the course of writing servo information) associated with the reference spirals may be measured and corrected before writing the servo information. Specifically, position correction values may be determined so as to adjust or re-adjust the position of the read/write head 108. The position correction values may be modified on a regular basis or updated at every track. This may be accomplished, for example, by taking advantage of the high degree of correlation in the repetitive runout in the neighboring tracks so that less processing time is used.

Once the repeatable runout has been accounted for, servo information may be written onto the disk by the read/write head 108. In some implementations, the read/write head 108 may switch from one reference spiral to another reference spiral after, for example, a track has been written. In these implementations, while writing servo information to any one track, the read/write head 108 remains at the same reference spiral. To switch between reference spirals, a seek operation may be performed. While track following using reference spirals, track ID values and servo information associated with a track may be determined and loaded into a write buffer. Timing corrections (e.g., such as position correction values as discussed above) also may be applied since spiral timing may have changed due to disk movement in a radial direction. Finally, the track ID values and servo information may be written to the platter.

Position correction values may be updated, while track-following on the reference spirals from a new radial location. Because the repeatable runout is generally correlated from track to track, it may not be necessary to gather completely new position correction values while track-following for many revolutions. A seek operation may be performed again to move to the following radial location and the updated position correction values may be used to reduce the repeatable runout before writing the servo information at this location.

When servoing on reference spirals to write servo information, the time of writing servo information may coincide with the time of reading information from the reference spirals. Timing clash may occur because the spirals shift in time relative to the servo patterns that are being written as the read/write head 108 moves from track to track. Timing clash may occur even through the write head and the read head may be physically offset. Thus, in some implementations, two separate sets of reference spirals may be written with respect to the number of servo wedges in the servo information. For example, if the servo information is to include 250 servo wedges, then substantially 500 reference spirals may be written on a disk. In these implementations, the reference spirals may be grouped into two distinct sets in the same band, where adjacent spirals may be, for example, in different sets.

While writing servo information onto the platter surface, the read head may servo on one of the two sets of spirals. Before a timing clash point, the read head may switch to servoing on the other set of reference spirals so as to avoid the timing clash.

In other implementations, the same number of reference spirals and servo wedges may be written. In these implementations, the self-servo writing process may alternate between reading and writing at every other spiral.

Alternative Approach

Figure 7A:
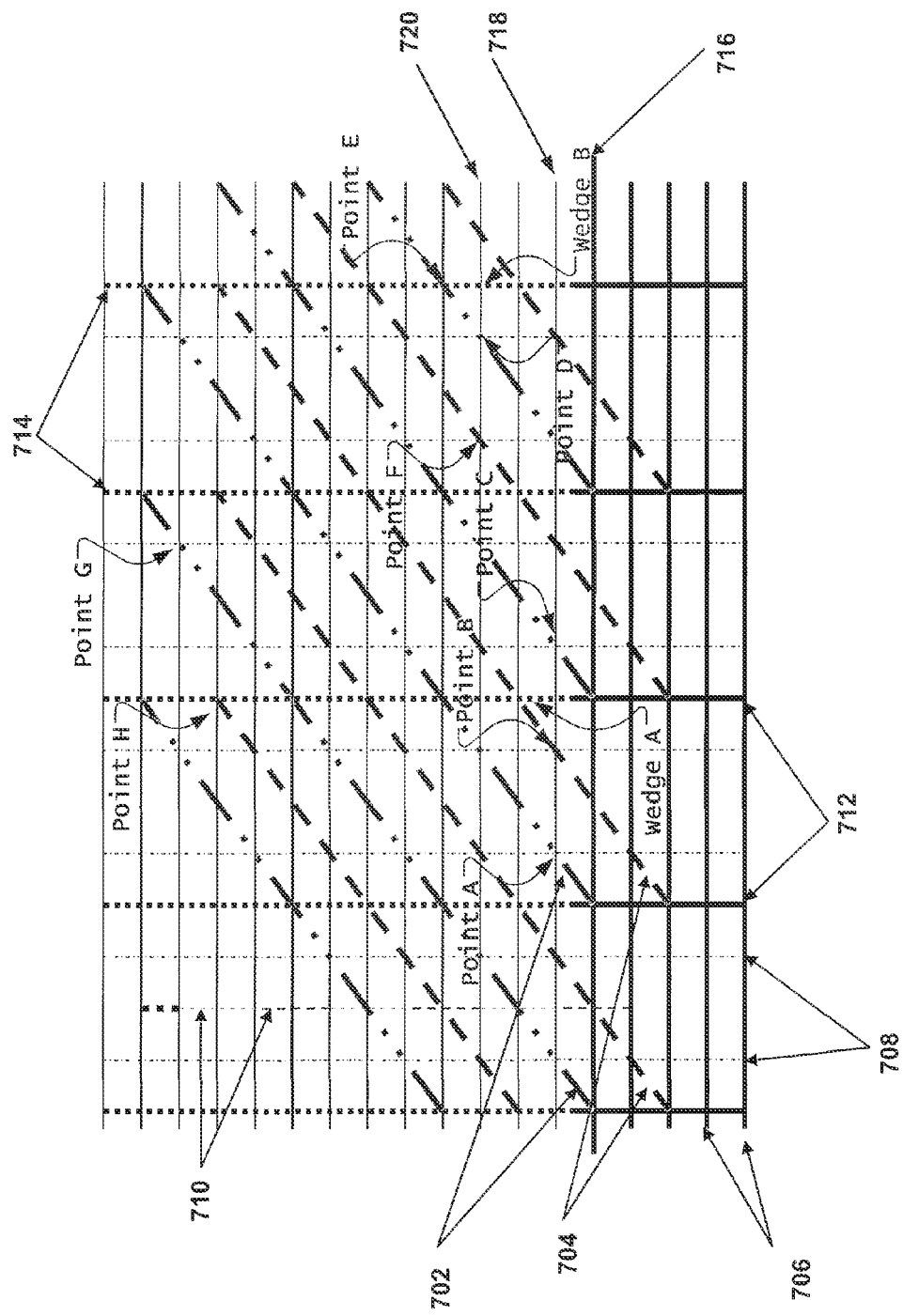
FIG. 7A shows two example reference spiral sets with one reference spiral set ending earlier than the other reference spiral set.

As discussed above, the writing of a new spiral band may begin (e.g., shortly or immediately) after writing a portion of the final servo information (e.g., the writing of a second spiral band may begin after writing a first portion of the final servo information). Specifically, the writing of the a new spiral band may launch at or substantially near the end of the previously written spiral band. In some implementations, where two (or more than two) distinct sets of reference spirals (where each set may contain a predetermined number of reference spirals) are used, the detection of the end of a spiral band may be carried out by writing one of the reference spiral sets earlier (e.g., radially) than the other set of the spirals. In these implementations, because each reference spiral has substantially equal length, the one set of reference spirals written earlier will also end earlier than the other set. FIG. 7A shows two spiral sets with one set ending earlier than the other set. In FIG. 7A, reference numeral 706 denotes tracks that have already been written by the read/write head 108; reference numeral 708 denotes switching radial locations where spiral set switching may take place; reference numeral 710 indicates a specific reference spiral set that is currently being track-followed; reference numeral 712 denotes written servo wedges; reference numeral 714 denotes servo wedges to be written by the read/write head 108; and reference numeral 716 denotes the last track written by the read/write head 108.

As shown in FIG. 7A, two sets of reference spirals 702 and 704 may be written in an adjacent side-by-side manner on a disk. Reference spirals in the reference spiral sets 704, in this example, may be written earlier than those in the reference spiral set 702. In some implementations, the read/write head 108 may lock onto only a single spiral set (e.g., spiral set 702 or spiral set 704). In some implementations, the read/write head 108 may switch to track follow a different spiral set at the designated switching locations 708, as will be discussed in greater detail below.

During operation, the read/write head 108 may use one or more reference spirals in either reference spiral set 702 or reference spiral set 704 for self-servo writing the servo information on the servo wedges. The read/write head 108 may lock onto, for example, one of the reference spirals in the reference spiral set 702, move to the starting point of the reference spiral, write a portion of the reference spiral, servo on the written portion of the reference spiral to write a portion of the servo information, seek and move to a next track, write a new portion of the reference spiral and write another portion of the servo information in the servo wedges while servoing on the new portion of the reference spiral.

The reference spirals in reference spiral sets 702/704 may be all written first, which may then be used to track follow (e.g., the read/write head 108 does not move radially) and write the final servo information. In these implementations, after the reference spirals in reference spiral sets 702/704 are written, the read/write head 108 may then move to the beginning of an associated spiral band, where final servo information may be written last. More specifically, during operation, the read/write head 108 may stay on track using one of the two reference spiral sets (e.g., spiral set 702), and write the final servo information (e.g., to create a servo track). Then, using the same reference spiral set, the read/write head 108 is moved by a predetermined distance (e.g., similar to moving a servo track width), and may continue to track follow at that location so that another track (i.e., final servo information) may be written. The foregoing process may be repeated, until which the reference spiral set that was used for positioning control approaches close to the location where the final servo information is to be written. At this point, the read/write head 108 may switch to the other reference spiral set (e.g., reference spiral set 704), and continue to repeat the aforementioned process until the end of the spiral band is reached. This example process may be repeated until all servo information has been written. The written wedges may be written over a portion of reference spiral 702.

The servo controller 129 may collect characteristics data (e.g., magnitude data) associated with both reference spiral sets (e.g., reference spiral set 702 and reference spiral set 704) while track following. In some implementations, the spirals of these two spiral sets may be interleaved. In these implementations, assuming there are 200 reference spirals of which 100 reference spirals may be grouped into the reference spiral set 702 while the remaining 100 reference spirals may be grouped into the reference spiral set 704, the read/write head 108 may track follow using a portion or all of the reference spirals of a given reference spiral set (e.g., all 100 reference spirals over one revolution, each reference spiral giving the position control information at a particular instant). Although only one of the two spiral sets is used for track following (e.g., to allow the position of the head 108 to be determined, and position corrections to be applied to the head 108 so that the head 108 may stay on a target position to avoid undesirable drift), the other reference spiral set also may be considered (e.g., by collecting magnitude information associated with the other spiral set). In these implementations, the magnitude information associated with the other reference spiral set is not used for current positioning control, but may still be collected so as to determine the magnitude data associated with the other spiral set (e.g., after switching takes place).

The collected characteristics data may then be used to develop a characteristic model for each reference spiral set. The characteristic model may be used for referencing a running average value for each reference spiral set. For example, from the characteristic model, a first running average value may be determined for reference spiral set 702, and a second running average value may be determined for reference spiral set 704.

Subsequently, the servo controller 129 may refer to the characteristic model to determine whether the end of a reference spiral set (e.g., the spiral set to which the read/write head 108 is to be switched) has been reached. Specifically, if the read/write head 108 cannot detect the presence of the next reference spiral set (e.g., because the magnitude of the spiral set has fallen below a predetermined threshold), then a spiral band end may be detected.

Referring to FIG. 7A, the writing of reference spiral set 702 may commence (e.g., radial-wise) before reference spiral set 704. Assuming that the read/write head 108 is writing along track 718 at point A, the read/write head 108 extracts, for example, position control information from reference spiral set 702 (e.g., at point A), moves across the reference spiral set 704 at point B, and begins writing servo information to establish wedge A. After writing wedge A, the read/write head 108 then continues along track 718 and detects reference spiral set 702 at point C. At point C, the read/write head 108 again extracts, for example, position control information from reference spiral set 702 at point C to write the next portion of the servo information.

At some point in time during writing, the read/write head 108 will eventually arrive at a point along a track where timing conflict between writing and reading occurs. For example, the read/write head 108 cannot servo on reference spiral 702 at point E while writing wedge B. Thus, in some implementations, the read/write head 108 may switch to servoing on the other reference spiral set to complete the writing of servo wedge B. For example, the read/write head 108 may determine that a timing clash is to occur, and switch to servoing on reference spiral 704 at point D (which also is a switching location). After switching, the read/write head 108 may extract position control information from the reference spiral set 704 at point F to complete the writing of servo wedge B.

When the read/write head 108 cannot detect the presence of the other spiral set (e.g., prior to switching), the servo controller 108 may determine whether the end of the spiral band has been detected. For example, the read/write head 108 may attempt to switch from one of the reference spirals in reference spiral set 702 to another reference spiral in the reference spiral set 704 at point G (because a timing conflict between reading references spiral and writing servo information is to occur). Because reference spiral set 704 has already ended (e.g., at point H), the servo controller 129 may determine that the end of the spiral band has been detected.

In some implementations, an end of a spiral band can be determined because the writing of reference spiral set 702 started before (e.g., radial-wise) the writing of reference spiral set 704 so that it was expected that the reference spirals in the reference spiral set 704 would end after those in the reference spiral set 702. This process may be based on the principle that because both reference spirals in both reference spiral sets 702/704 are of equal length, when the read/write head 108 begins with a reference spiral (e.g., in reference spiral set 702) that starts earlier than the other, then the read/write head 108 should end up at the reference spiral that was written later.

Alternatively, the servo controller 129 may determine whether the end of the spiral band has been detected by detecting, for example, whether one of the spiral sets (e.g., one not be track followed) has come to an end. For example, the HDD system 100 may detect that reference spiral set 704 has ended (e.g., detecting that reference spiral set 704 at point H has ended) while the read/write head 108 is on the reference spiral set 702. Based on this determination, the servo controller 129 may determine that the end of the spiral band has been detected, and terminate the writing of servo information.

Figure 7B:
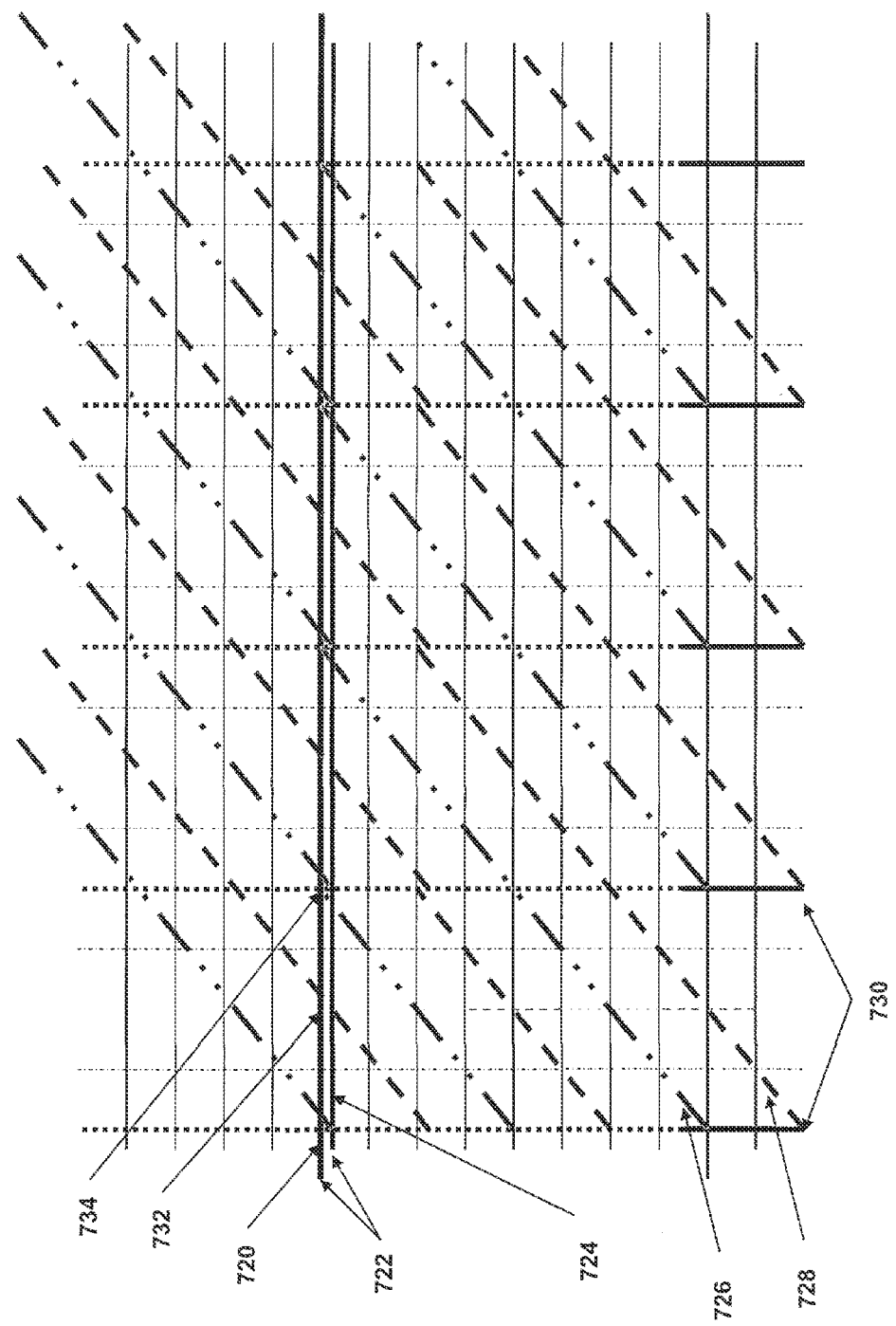
FIG. 7B shows an example new spiral band written near a previously-written spiral band in a spiral overlap region.

Once a spiral band has ended, a new spiral band may be launched at or near the spiral band that had just ended. In other words, the writing of a new spiral band may begin at or near the endpoint of the previously-written spiral band. FIG. 7B shows a new spiral band written near a previously-written spiral band in a spiral overlap region. As shown in FIG. 7B, a spiral overlap region 722 may be a region where a new set of spiral bands may be launched. The spiral overlap region 722 may be bound by the last written final track 720, track 724 and the written final wedges 730. In some implementations, the track 724 may be determined from the already-written servo tracks, which may provide, for example, the number of tracks already written, the last track written and the like.

In the overlap region 722, the new spiral band may extend from where the previously-written spiral band has ended. For example, reference spiral set 728 may end at the final track 724, and may begin a new band from the final track 724, as indicated by reference numeral 732. Alternatively, the new spiral band may begin near the end of the previously-written spiral band. For example, reference spiral set 726 may end within the spiral overlap region 722, and a new band may be launched near (e.g., adjacent to) that end, as indicated by reference numeral 734.

Figure 8A:
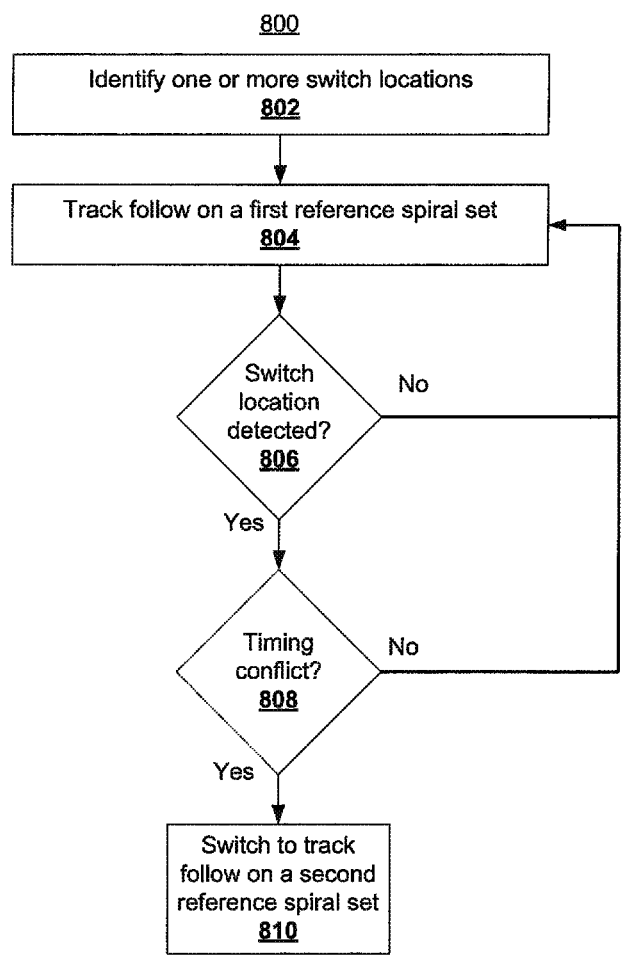
FIG. 8A shows an example process for switching between a first reference spiral set and a second reference spiral set.

FIG. 8A shows an example process 800 for switching between a first reference spiral and a second reference spiral. Process 800 may be performed, for example, by the HDD system 100, and for clarity of presentation, the description that follows uses the HDD system 100 as the basis of examples for describing the process 800. However, another apparatus, system, or combination of systems, may be used to perform the process 800.

Referring to FIG. 8A, process 800 begins with identifying one or more switch locations on a disk (802). The switch locations may include, for example, the switch locations 708 shown in FIG. 7A. Track following may be initiated (e.g., the read/write head 108 may proceed to track follow the first spiral) (804). In some implementations, track following on a first reference spiral may include collecting data associated with the first reference spiral. In some implementations, data may include characteristics data such as magnitude of a reference signal generated in response to detecting a reference spiral, location of the reference spiral, and the like. The data also may include data associated with a running average value. The running average value may be used as a threshold value for comparing between a first set of spiral bands and a second set of spiral bands, as will be discussed in greater detail below with respect to FIG. 8B.

In some implementations, collecting data associated with the first reference spiral may include identifying a running average value from the collected data by averaging the collected data by the number of reference spirals being used by the read/write head 108 for writing servo information. In some implementations, averaging the collected data may include averaging the magnitude of a reference signal generated in response to detecting each reference signal so as to obtain an average magnitude among the detected spirals.

In some implementations, the running average value may be determined by averaging a reference spiral over a series of spiral bands. For example, if a spiral spans across three spiral bands, then data of the spiral over the three spiral bands may be averaged to determine a running average value associated with the spiral.

When a switch location is detected ("Yes" branch of operation 806), a determination is made whether a timing conflict exists between writing servo information and reading out data from the first reference spiral set. If a timing conflict exists ("Yes" branch of operation 808), track following on a second reference spiral may be initiated (e.g., the read/write head 108 may be commanded to switch at the switch location so as to track follow on a second reference spiral set) (810). The read/write head 108 also may collect data associated with the second reference spiral while track following on the second reference spiral set.

Referring back to operation 806, if no switch location has been detected ("No" branch of operation 806), track following on the first reference spiral may continue (e.g., the read/write head 108 may continue to track follow on the first reference spiral while collecting data from the first spiral set) (i.e., repeat operation 804).

In some implementations, operations 802-810 may be performed in the order listed, in parallel (e.g., by the same or a different process, substantially or otherwise non-serially), or in reverse order to achieve the same result. In other implementations, operations 802-810 may be performed out of the order shown. For example, process 800 may first begin with track following on a first spiral (804) before identifying one or more switch locations (802). As another example, a determination whether a timing conflict exists (808) may be performed before determining whether a switch location has been detected (806). Also, the order in which the operations are performed may depend, at least in part, on what entity performs the method. Operations 802-810 further may be performed by the same or different entities or systems.

Figure 8B:
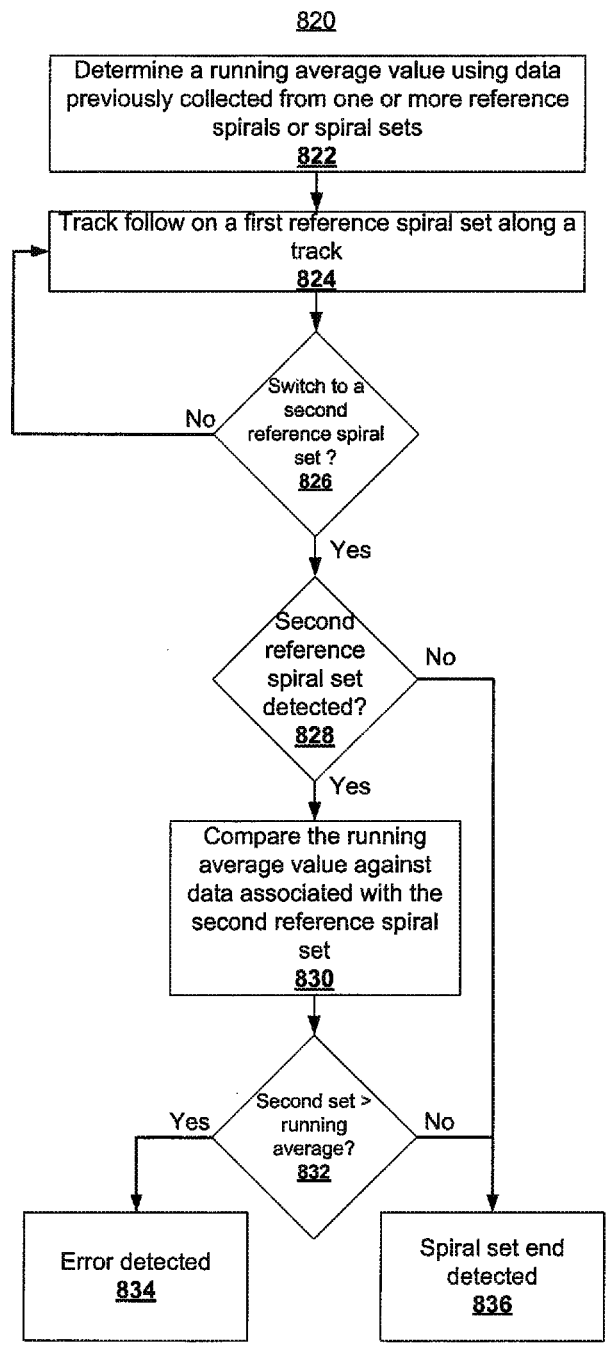
FIG. 8B shows an example process for determining the end of a spiral band using a running average value.

FIG. 8B shows a process 820 for determining the end of a spiral band using a running average value. Similar to process 800, process 820 may be performed, for example, by the HDD system 100, and for clarity of presentation, the description that follows uses the HDD system 100 as the basis of examples for describing the process 820. However, another apparatus, system, or combination of systems, may be used to perform the process 820.

Referring to FIG. 8B, process 820 begins with determining a running average value using data previously collected from one or more reference spirals or spiral sets (822). In some implementations, such data may include data associated with one or more reference spirals of a first reference spiral set, one or more reference spirals of a second reference spiral set, one or more reference spirals of a third reference spiral set, or a combination thereof. In some implementations, the data used to determine the running average value may be collected while track following on the particular reference spiral for which the data is being used. Of course, data not associated with any of the reference spirals being track followed also can be contemplated in determining the running average value.

As track following on a first reference spiral along a track is initiated (824), a determination is made whether to switch to track following on a second reference spiral (e.g., should the read/write head 108 be commanded to switch to track follow on a second reference spiral) (826). In some implementations, switching to a second reference spiral may include determining whether a switch location has been detected.

In some implementations, the switching locations may include those shown in FIG. 7A (e.g., switching locations 708). In other implementations, switching may be performed at any region that indicates that a particular reference spiral set is too close to a location at which servo information is to be written.

If it is determined that no switch is to occur ("No" branch of operation 826), then track following on the first reference spiral continues (e.g., the read/write head 108 may continue to track follow on the first reference spiral). If it is determined that a switch is to occur (e.g., that the read/write head 108 is to be switched over to the second reference spiral) ("Yes" branch of operation 826), then a determination whether the presence of the second reference spiral has been detected is made (828). If the presence of the second reference spiral ("No" branch of operation 828) is not detected, then process 820 can conclude that the end of the spiral set (and hence the entire spiral band including both reference spirals) has been detected (836). However, if the second reference spiral set is present ("Yes" branch of operation 828), a comparison is made of the running average value against data associated with the second reference spiral (830). Based on the comparison, a determination is made whether data (e.g., magnitude data) associated with the second reference spiral is greater or larger than data associated with the first reference spiral (832). If data associated with the second reference spiral is greater or larger than the running average value ("Yes" branch of operation 832), then error may be detected (834). In some implementations, the error may be ignored.

If data associated with the second reference spiral set is not greater or larger than the running average value ("No" branch of operation 832), then a spiral set end may be detected (836). In some implementations, a threshold may be used to indicate whether data associated with the second reference spiral set is (or is not) greater or larger than the running average value. For example, a threshold of 80% may be used where the second reference spiral set may be determined to be smaller than the running average when dropped below 80% of the actual or desired value, e.g., check for when data associated with the second reference spiral drop below 80% of the running average value. check for a certain threshold for example for example when data associated with the second reference check drop below 80% of the running average value.

Example Implementations of Hard Disk Drive

Figure 9:
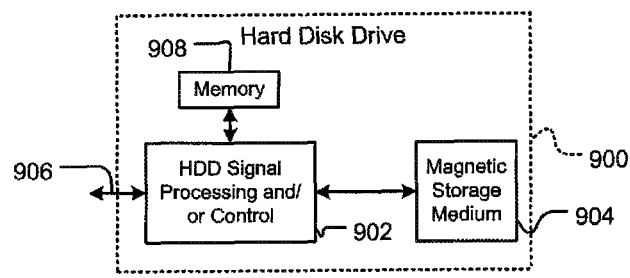
FIGS. 9-15 show various example electronic systems implementing a hard disk drive system.

FIGS. 9-15 show various example implementations of the described systems and techniques. Referring now to FIG. 9, the described systems and techniques can be implemented in a hard disk drive (HDD) 900. The described systems and techniques may be implemented in either or both signal processing and/or control circuits, which are generally identified in FIG. 9 as 902. In some implementations, the signal processing and/or control circuit 902 and/or other circuits (not shown) in the HDD 900 may process data, perform coding and/or encryption, perform calculations, and/or format data that is output to and/or received from a magnetic storage medium 904.

The HDD 900 may communicate with a host device (not shown) such as a computer, mobile computing devices such as personal digital assistants, cellular phones, media or MP3 players and the like, and/or other devices via one or more wired or wireless communication links 906. The HDD 900 may be connected to memory 908 such as random access memory (RAM), low latency nonvolatile memory such as flash memory, read only memory (ROM) and/or other suitable electronic data storage.

Figure 10:
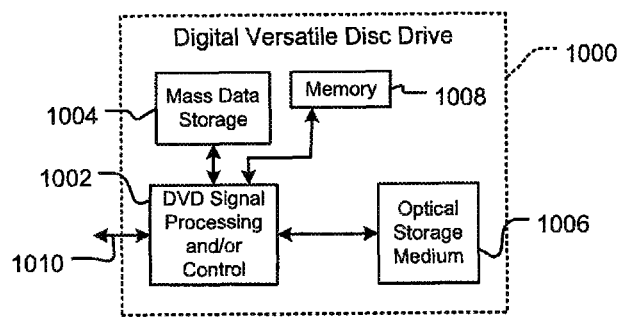

Referring now to FIG. 10, the described systems and techniques can be implemented in a digital versatile disc (DVD) drive 1000. The described systems and techniques may be implemented in either or both signal processing and/or control circuits, which are generally identified in FIG. 10 as 1002, and/or mass data storage 1004 of the DVD drive 1000. The signal processing and/or control circuit 1002 and/or other circuits (not shown) in the DVD drive 1000 may process data, perform coding and/or encryption, perform calculations, and/or format data that is read from and/or data written to an optical storage medium 1006. In some implementations, the signal processing and/or control circuit 1002 and/or other circuits (not shown) in the DVD drive 1000 can also perform other functions such as encoding and/or decoding and/or any other signal processing functions associated with a DVD drive.

The DVD drive 1000 may communicate with an output device (not shown) such as a computer, television or other device via one or more wired or wireless communication links 1010. The DVD drive 1000 may communicate with mass data storage 1004 that stores data in a nonvolatile manner. The mass data storage 1004 may include a hard disk drive (HDD). The HDD may have the configuration shown in FIG. 9. The HDD may be a mini HDD that includes one or more platters having a diameter that is smaller than approximately 1.8". The DVD drive 1000 may be connected to memory 1008 such as RAM, ROM, low latency nonvolatile memory such as flash memory and/or other suitable electronic data storage.

Figure 11:
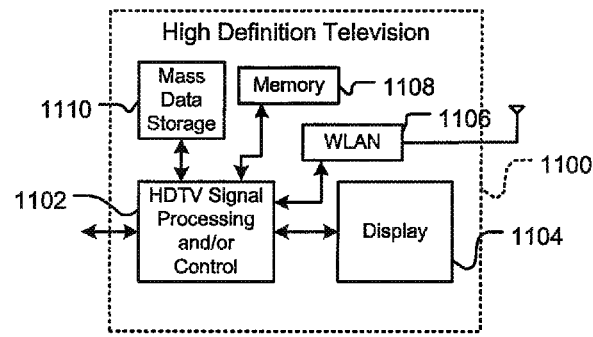

Referring now to FIG. 11, the described systems and techniques can be implemented in a high definition television (HDTV) 1100. The described systems and techniques may be implemented in either or both signal processing and/or control circuits, which are generally identified in FIG. 11 as 1102, a WLAN interface 1106 and/or mass data storage 1110 of the HDTV 1100. The HDTV 1100 receives HDTV input signals in either a wired or wireless format and generates HDTV output signals for a display 1104. In some implementations, signal processing circuit and/or control circuit 1102 and/or other circuits (not shown) of the HDTV 1100 may process data, perform coding and/or encryption, perform calculations, format data and/or perform any other type of HDTV processing that may be required.

The HDTV 1100 may communicate with mass data storage 1110 that stores data in a nonvolatile manner such as optical and/or magnetic storage devices, for example, hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The HDTV 1100 may be connected to memory 1108 such as RAM, ROM, low latency nonvolatile memory such as flash memory and/or other suitable electronic data storage. The HDTV 1100 also may support connections with a WLAN via a WLAN network interface 1106.

Figure 12:
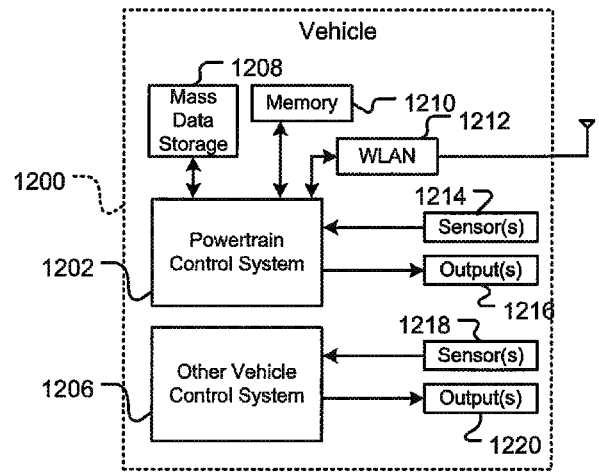

Referring now to FIG. 12, the described systems and techniques may be implemented in a control system of a vehicle 1200, a WLAN interface 1212 and/or mass data storage 1208 of the vehicle control system 1200. In some implementations, the described systems and techniques may be implemented in a powertrain control system 1202 that receives inputs from one or more sensors 1214 such as temperature sensors, pressure sensors, rotational sensors, airflow sensors and/or any other suitable sensors and/or that generates one or more output control signals such as engine operating parameters, transmission operating parameters, braking parameters and/or other control signals to one or more output devices 1216.

The described systems and techniques may also be implemented in other control systems 1206 of the vehicle 1200. The control system 1206 may likewise receive signals from input sensors 1218 and/or output control signals to one or more output devices 1220. In some implementations, the control system 1206 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1202 may communicate with mass data storage 1208 that stores data in a nonvolatile manner. The mass data storage 1208 may include optical and/or magnetic storage devices for example hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The powertrain control system 1202 may be connected to memory 1210 such as RAM, ROM, low latency nonvolatile memory such as flash memory and/or other suitable electronic data storage. The powertrain control system 1202 also may support connections with a WLAN via a WLAN interface 1212. The control system 1206 may also include mass data storage, memory and/or a WLAN interface (all not shown).

Figure 13:
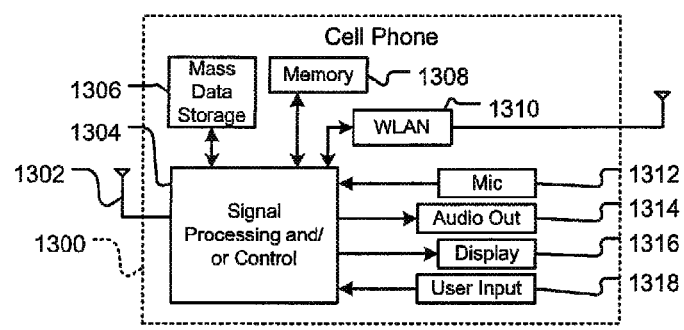

Referring now to FIG. 13, the described systems and techniques can be implemented in a cellular phone 1300 that may include a cellular antenna 1302. The described systems and techniques may be implemented in either or both signal processing and/or control circuits, which are generally identified in FIG. 13 as 1304, a WLAN interface 1310 and/or mass data storage 1306 of the cellular phone 1300. In some implementations, the cellular phone 1300 includes a microphone 1312, an audio output 1314 such as a speaker and/or audio output jack, a display 1316 and/or an input device 1318 such as a keypad, pointing device, voice actuation and/or other input device. The signal processing and/or control circuits 1304 and/or other circuits (not shown) in the cellular phone 1300 may process data, perform coding and/or encryption, perform calculations, format data and/or perform other cellular phone functions.

The cellular phone 1300 may communicate with mass data storage 1306 that stores data in a nonvolatile manner such as optical and/or magnetic storage devices for example hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The cellular phone 1300 may be connected to memory 1308 such as RAM, ROM, low latency nonvolatile memory such as flash memory and/or other suitable electronic data storage. The cellular phone 1300 also may support connections with a WLAN via a WLAN interface 1310.

Figure 14:
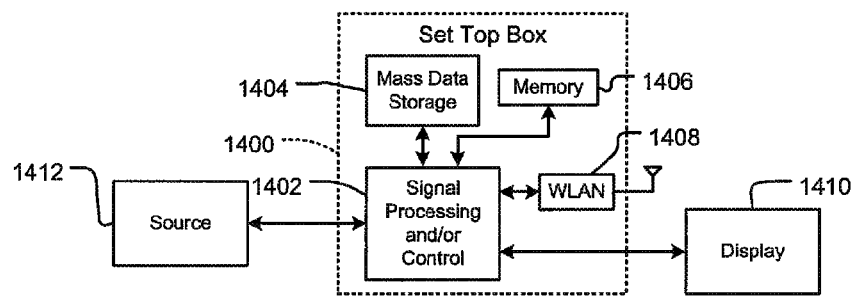

Referring now to FIG. 14, the described systems and techniques can be implemented in a set top box 1400. The described systems and techniques may be implemented in either or both signal processing and/or control circuits, which are generally identified in FIG. 14 as 1402, a WLAN interface 1408 and/or mass data storage 1404 of the set top box 1400. The set top box 1400 receives signals from a source 1412 such as a broadband source and outputs standard and/or high definition audio/video signals suitable for a display 1410 such as a television and/or monitor and/or other video and/or audio output devices. The signal processing and/or control circuits 1402 and/or other circuits (not shown) of the set top box 1400 may process data, perform coding and/or encryption, perform calculations, format data and/or perform any other set top box function.

The set top box 1400 may communicate with mass data storage 1404 that stores data in a nonvolatile manner. The mass data storage 1404 may include optical and/or magnetic storage devices for example hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The set top box 1400 may be connected to memory 1406 such as RAM, ROM, low latency nonvolatile memory such as flash memory and/or other suitable electronic data storage. The set top box 1400 also may support connections with a WLAN via a WLAN interface 1408.

Figure 15:
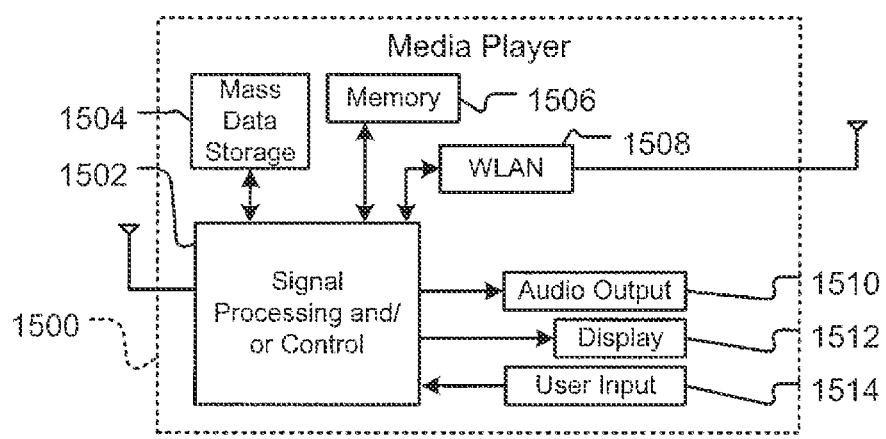

Referring now to FIG. 15, the described systems and techniques can be implemented in a media player 1500. The described systems and techniques may be implemented in either or both signal processing and/or control circuits, which are generally identified in FIG. 15 as 1502, a WLAN interface 1508 and/or mass data storage 1504 of the media player 1500. In some implementations, the media player 1500 includes a display 1512 and/or a user input 1514 such as a keypad, touchpad and the like. In some implementations, the media player 1500 may employ a graphical user interface (GUI) that typically employs menus, drop down menus, icons and/or a point-and-click interface via the display 1512 and/or user input 1514. The media player 1500 further includes an audio output 1510 such as a speaker and/or audio output jack. The signal processing and/or control circuits 1502 and/or other circuits (not shown) of the media player 1500 may process data, perform coding and/or encryption, perform calculations, format data and/or perform any other media player function.

The media player 1500 may communicate with mass data storage 1504 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The media player 1500 may be connected to memory 1506 such as RAM, ROM, low latency nonvolatile memory such as flash memory and/or other suitable electronic data storage. The media player 1500 also may support connections with a WLAN via a WLAN interface 1508. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A device comprising:
    read/write channel signal processing circuitry to couple with a read/write head to write servo information on a storage medium using a first spiral set and a second spiral set different from the first spiral set; and
    a controller coupled with the read/write channel signal processing circuitry configured to:
        identify one or more switch locations on the storage medium;
        control the read/write head to track follow on the first spiral set;
        detect the one or more switch locations on the first spiral set while the read/write head track-follows on the first spiral set;
        determine if a timing conflict exists between the read/write head writing the servo information and reading out data from the first spiral set;
        control the read/write head to track-follow on the second spiral set if the timing conflict exists; and
        detect an end of a band of spirals comprising the first spiral set and the second spiral set based on a comparison of one or more detected characteristics of the first spiral set and the second spiral set.

2. The device of claim 1, wherein the controller is configured to identify one or more radial locations as the one or more switch locations where the read/write head switches to track-follow between the first spiral set and the second spiral set.

3. The device of claim 1, wherein the controller is configured to control the read/write head to collect data associated with the first spiral set when the read/write head track-follows on the first spiral set, and data associated with the second spiral set when the read/write head track-follows on the second spiral set.

4. The device of claim 1, wherein the controller is configured to control the read/write head to continue to track-follow on the first spiral set if the timing conflict does not exist.

5. The device of claim 1, wherein the first spiral set is written onto the storage medium earlier than the second spiral set such that the read/write head completes track-following on the second spiral set.

6. The device of claim 1, wherein the controller is configured to determine the end of the band of spirals if the second spiral set has not been detected.

7. The device of claim 1, wherein the controller is configured to determine the end of the band of spirals if the one or more detected characteristics associated with the first spiral set are greater than those associated with the second spiral set.

8. The device of claim 1, wherein the one or more detected characteristics associated with the first spiral set include an average value of a signal amplitude associated with each spiral of the first spiral set.

9. A device comprising:
    read/write channel signal processing circuitry to couple with a read/write head to write servo information on a storage medium using a first spiral set and a second spiral set different from the first spiral set; and
    a controller coupled with the read/write channel signal processing circuitry configured to:
        identify one or more switch locations on the storage medium;
        control the read/write head to track follow on the first spiral set;
        detect the one or more switch locations on the first spiral set while the read/write head track-follows on the first spiral set;
        determine if a timing conflict exists between the read/write head writing the servo information and reading out data from the first spiral set; and
        control the read/write head to track-follow on the second spiral set if the timing conflict exists;
    wherein the controller is configured to control the read/write head to collect data associated with the first spiral set and the second spiral set, and to identify a running average value from the collected data by averaging the collected data by a number of spirals in the first spiral set and the second spiral set used by the read/write head for writing the servo information.

10. The device of claim 9, wherein the controller is configured to average a magnitude of a reference signal generated in response to detecting each spiral in the first spiral set and the second spiral set so as to obtain the running average value that is representative of an average magnitude among the detected spirals.

11. The device of claim 9, wherein the controller is configured to identify one or more radial locations as the one or more switch locations where the read/write head switches to track-follow between the first spiral set and the second spiral set.

12. The device of claim 9, wherein the controller is configured to control the read/write head to collect data associated with the first spiral set when the read/write head track-follows on the first spiral set, and data associated with the second spiral set when the read/write head track-follows on the second spiral set.

13. The device of claim 9, wherein the controller is configured to control the read/write head to continue to track-follow on the first spiral set if the timing conflict does not exist.

14. The device of claim 9, wherein the first spiral set is written onto the storage medium earlier than the second spiral set such that the read/write head completes track-following on the second spiral set.

15. A device comprising:
    read/write channel signal processing circuitry to couple with a read/write head to write servo information on a storage medium using a first spiral set and a second spiral set different from the first spiral set; and
    a controller coupled with the read/write channel signal processing circuitry configured to:
        determine one or more characteristics associated with a first spiral set;
        control the read/write head to track-follow on the first spiral set;
        detect a switching location;
        determine, in response to the switching location, whether a second spiral set has been detected and whether the read/write head is to track-follow on the second spiral set;
        compare the one or more characteristics associated with the first spiral set with those associated with the second spiral set; and
        detect an end of a band of spirals comprising the first spiral set and the second spiral set based on the comparison.

16. The device of claim 15, wherein the controller is configured to determine the end of the band of spirals if the second spiral set has not been detected.

17. The device of claim 15, wherein the controller is configured to determine the end of the band of spirals if the one or more characteristics associated with the first spiral set are greater than those associated with the second spiral set.

18. The device of claim 15, wherein the one or more characteristics associated with the first spiral set include an average value of a signal amplitude associated with each spiral of the first spiral set.

* * * * *